US012581445B2

(12) United States Patent
Velev et al.

(10) Patent No.:    US 12,581,445 B2
(45) Date of Patent:        Mar. 17, 2026

(54) CONFIGURATION FOR UE ACCESS TO A SPECIFIC NETWORK SLICE

(71) Applicant: Lenovo (Singapore) PTE. LTD., New Tech Park (SG)

(72) Inventors: Genadi Velev, Darmstadt (DE); Apostolis Salkintzis, Athens (GR); Andreas Kunz, Ladenburg (DE)

(73) Assignee: Lenovo (Singapore) Pte. Ltd., Singapore (SG)

( * ) Notice:    Subject to any disclaimer, the term of this patent is extended or adjusted under 35 U.S.C. 154(b) by 293 days.

(21) Appl. No.:    17/995,757

(22) PCT Filed:    Apr. 7, 2020

(86) PCT No.:    PCT/EP2020/059936

§ 371 (c)(1),
(2) Date:    Oct. 7, 2022

(87) PCT Pub. No.: WO2021/204369

PCT Pub. Date: Oct. 14, 2021

(65)            Prior Publication Data

US 2023/0189187 A1        Jun. 15, 2023

(51) Int. Cl.
 *H04W 60/00*            (2009.01)
 *H04W 36/00*            (2009.01)
            (Continued)

(52) U.S. Cl.
 CPC ........... *H04W 60/00* (2013.01); *H04W 36/06* (2013.01); *H04W 36/13* (2023.05); *H04W 36/1446* (2023.05)

(58) Field of Classification Search
 CPC . H04W 60/00; H04W 36/13; H04W 36/1446; H04W 36/06
            (Continued)

(56)            References Cited

U.S. PATENT DOCUMENTS 10,491,376 B1 *  11/2019  Suthar ................... H04L 63/102
2018/0376444 A1 *  12/2018  Kim ...................... H04W 76/30
            (Continued)

FOREIGN PATENT DOCUMENTS

EP            3534649 A1      4/2019

OTHER PUBLICATIONS

PCT/EP2020/059936 "Notification of Transmittal of the International Search Report and the Written Opinion of the International Searching authority, or the Declaration", International Searching Authority, Dec. 8, 2020, pp. 1-15.
Huawei, Hisilicon, "Slice Availability for Cell (Re-)Selection", 3GPP TSG-RAN WG2#98 R2-1704973, May 15-19, 2017, pp. 1-4.
CATT, "Slice Based UE Mobility Optimization", 3GPP TSG-RAN WG2 Meeting #106 R2-1905869, May 13-17, 2019, pp. 1-3.
            (Continued)

*Primary Examiner* — Allahyar Kasraian
(74) *Attorney, Agent, or Firm* — Kunzler Needham & Hilton

(57)            ABSTRACT

Apparatuses, methods, and systems are disclosed for provisioning a UE with information to access a specific service. One apparatus includes a transceiver that communicates with a mobile communication network and a processor that sends a first registration request to the mobile communication network, the mobile communication network supporting a plurality of network slices. The processor receives configuration information from the mobile communication network, the configuration information enabling the apparatus to use at least one network slice from the plurality of network slices, wherein the configuration information includes a frequency priority for the at least one network slice. The processor performs cell reselection using at least the frequency priority and sends a second registration request to the mobile communication network after performing the cell reselection, wherein the second registration requests to register with the at least one network slice.

20 Claims, 13 Drawing Sheets

(51) Int. Cl.
    *H04W 36/06*          (2009.01)
    *H04W 36/14*          (2009.01)

(58) Field of Classification Search
    USPC ................... 455/435.1, 432.1, 410, 466, 418
    See application file for complete search history.

(56)                References Cited

U.S. PATENT DOCUMENTS

| | | | | |
|---|---|---|---|---|
| 2019/0007500 | A1* | 1/2019 | Kim ..................... | H04L 67/141 |
| 2020/0059761 | A1* | 2/2020 | Li ........................... | H04W 4/24 |
| 2020/0260525 | A1* | 8/2020 | Gan ..................... | H04W 48/18 |
| 2020/0314701 | A1* | 10/2020 | Talebi Fard .......... | H04W 36/13 |
| 2021/0219264 | A1* | 7/2021 | Chen ..................... | H04W 76/27 |
| 2022/0353668 | A1* | 11/2022 | Qu ....................... | H04W 8/186 |

OTHER PUBLICATIONS

Motorola Mobility, et.al., "Allowed NSSAI mapping information", SA WG2 Meeting #S2-122 S2-175051, Jun. 26-30, 2017, pp. 1-5.

3GPP, "3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.

3GPP, "3rd Generation Partnership Project; Technical Specification Group Services and System Aspects; Procedures for the 5G System (5GS); Stage 2 (Release 16)", 3GPP TS 23.502 V16.4.0, Mar. 2020, pp. 1-582.

3GPP, "3rd Generation Partnership Project; Technical Specification Group Services and System Aspects; Security architecture and procedures for 5G system (Release 16)", 3GPP TS 33.501 V16.2.0, Mar. 2020, pp. 1-227.

* cited by examiner

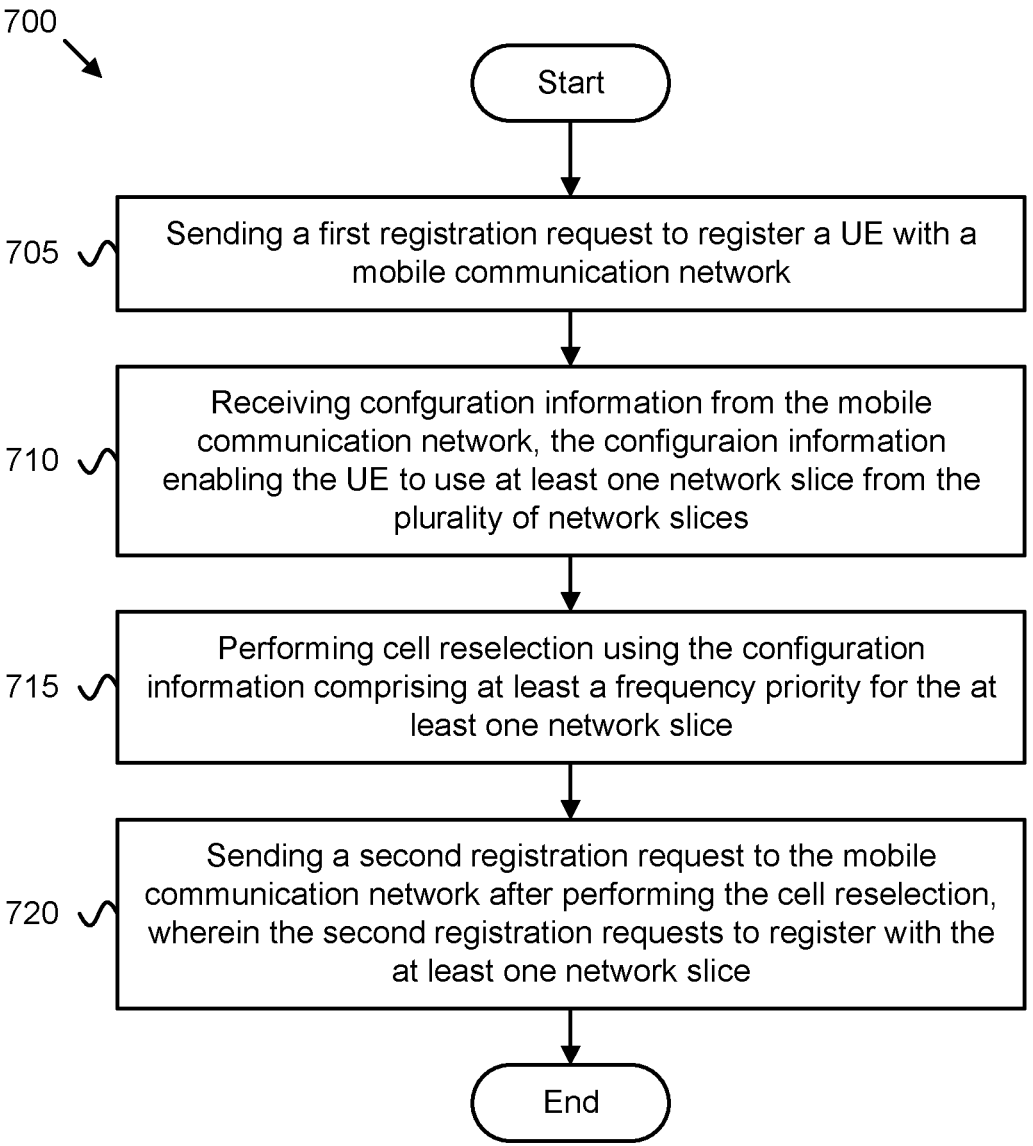

700

Start

705 — Sending a first registration request to register a UE with a mobile communication network 710 — Receiving confguration information from the mobile communication network, the configuraion information enabling the UE to use at least one network slice from the plurality of network slices 715 — Performing cell reselection using the configuration information comprising at least a frequency priority for the at least one network slice 720 — Sending a second registration request to the mobile communication network after performing the cell reselection, wherein the second registration requests to register with the at least one network slice End

FIG. 7

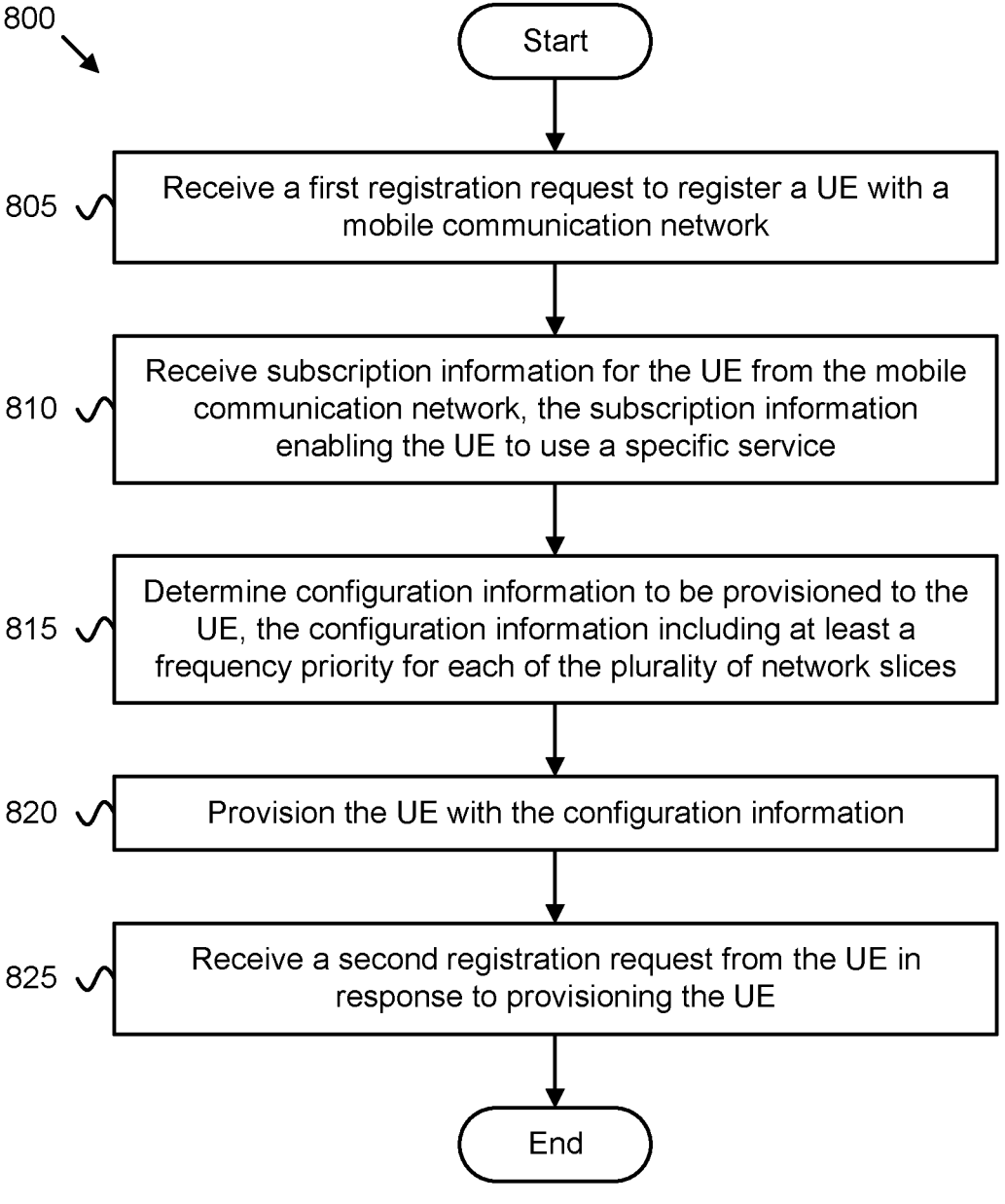

800

Start

805   Receive a first registration request to register a UE with a mobile communication network 810   Receive subscription information for the UE from the mobile communication network, the subscription information enabling the UE to use a specific service 815   Determine configuration information to be provisioned to the UE, the configuration information including at least a frequency priority for each of the plurality of network slices 820   Provision the UE with the configuration information 825   Receive a second registration request from the UE in response to provisioning the UE End

FIG. 8

CONFIGURATION FOR UE ACCESS TO A SPECIFIC NETWORK SLICE

The subject matter disclosed herein relates generally to wireless communications and more particularly relates to configuring a UE for a specific service, e.g., in a non-public mobile network.

BACKGROUND

The following abbreviations and acronyms are herewith defined, at least some of which are referred to within the following description.

Third Generation Partnership Project ("3GPP"), Fifth-Generation Core ("5GC"), Access and Mobility Management Function ("AMF"), Access Point Name ("APN"), Access Stratum ("AS"), Application Programing Interface ("API"), Business Support System ("BSS"), Data Network Name ("DNN"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), Fully Qualified Domain Name ("FQDN"), Home Subscriber Server ("HSS"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Network Operator ("MNO"), Mobility Management Entity ("MME"), Non-Access Stratum ("NAS"), Narrowband ("NB"), Network Function ("NF"), Network Access Identifier ("NAT"), Next Generation (e.g., 5G) Node-B ("gNB"), Next Generation Radio Access Network ("NG-RAN"), New Radio ("NR"), Operation Administration and Management ("OAM"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Single Network Slice Selection Assistance Information ("S-NSSAI"), Serving Gateway ("SGW"), Session Management Function ("SMF"), Subscription Permanent Identifier ("SUPI"), Transmission Control Protocol ("TCP"), Transmit ("Tx"), Unified Data Management ("UDM"), User Entity/Equipment (Mobile Terminal) ("UE"), Uplink ("UL"), User Plane ("UP"), Universal Mobile Telecommunications System ("UMTS"), User Datagram Protocol ("UDP"), Wireless Local Area Network ("WLAN"), and Worldwide Interoperability for Microwave Access ("WiMAX").

In certain embodiments, non-public networks (NPN) are deployed to serve private (i.e., non-public) customers and/or service. An NPN can offer also a public service (public telephony service or emergency service), if the NPN has an agreement with a PLMN or an access to PSTN.

BRIEF SUMMARY

Methods for provisioning a UE with information to access a specific service are disclosed. Apparatuses and systems also perform the functions of the methods.

One method of a UE, e.g., for provisioning a UE with information to access a specific service, includes sending a first registration request to the mobile communication network, the mobile network supporting a plurality of network slices. The method includes receiving configuration information from the mobile communication network, the configuration information enabling the UE to use at least one network slice from the plurality of network slices, wherein the configuration information includes a frequency priority for the at least one network slice. The method includes performing cell reselection using at least the frequency priority and sending a second registration request to the mobile communication network after performing the cell reselection, wherein the second registration requests to register with the at least one network slice.

One method of an AMF, e.g., for provisioning a UE with information to access a specific service, includes receiving a first registration request to register a UE with a mobile communication network. The method includes receiving subscription information for the UE from the mobile communication network and determining configuration information to be provisioned to the UE. Here, the subscription information enabling the UE to use a specific service and the configuration information includes at least a frequency priority for each of the plurality of network slices. The method includes provisioning the UE with the configuration information and receiving a second registration request from the UE in response to provisioning the UE.

One method of a UDM, e.g., for provisioning a UE with information to access a specific service, includes storing at least default subscription information for the UE and updated subscription information for a UE. Here, the default subscription information enables the UE to access a default service and the updated subscription information enable the UE to use a specific service. The method includes receiving a request from the AMF for subscription data of the UE and determining that the UE requires provisioning and determining a type of subscription data to transmit to the AMF. Here, the type of subscription data may be the default subscription information or the updated subscription information. The method includes transmitting subscription data to the AMF to configure the UE and to configure the network (e.g., AMF and RAN) to use the specific service.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a flow chart diagram illustrating one embodiment of a first method for provisioning a UE with information to access a specific service;

FIG. 8 is a flow chart diagram illustrating one embodiment of a second method for provisioning a UE with information to access a specific service.

DETAILED DESCRIPTION

Figure 1:
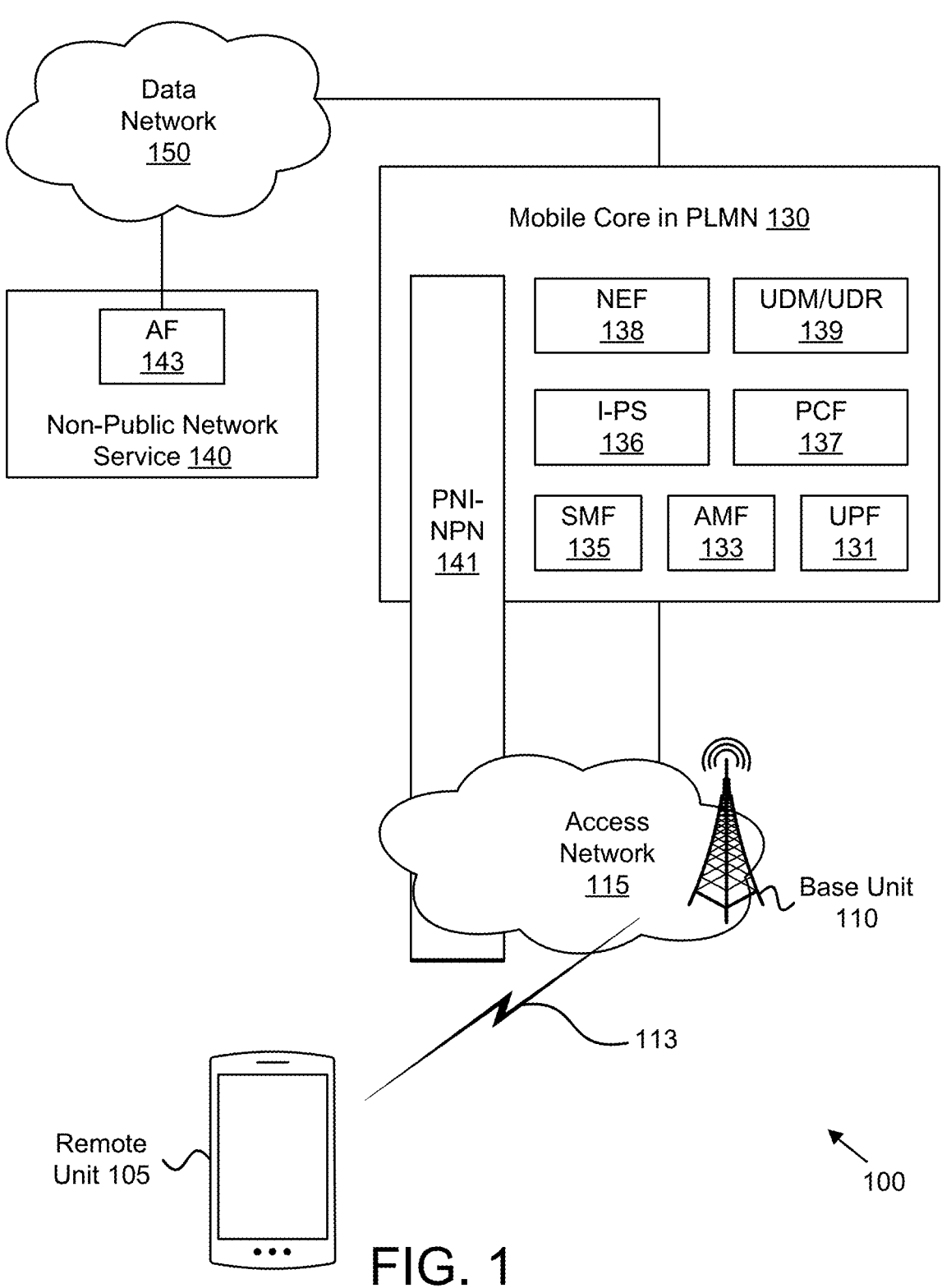
FIG. 1 is a diagram illustrating one embodiment of a wireless communication system for provisioning a UE with information to access a specific service.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/ acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for provisioning a UE with information to access a specific service.

Non-public networks (NPN) are networks according to the 5G system (5GS) which are deployed to serve private (i.e., non-public) customers and/or service. An NPN can offer also a public service (public telephony service or emergency service), if the NPN has an agreement with a PLMN or an access to PSTN. An NPNs can be deployed in different ways, for example 1) either stand-alone (SNPN) or 2) public network integrated (PNI-NPN). The SNPNs can be operated by an NPN operator and not relying on network functions provided by a PLMN. In contrast, the PNI-NPNs are deployed via a public land mobile network (PLMN) by means of dedicated data network names (DNNs), or by one (or more) Network Slice instances allocated for the NPN. In case of PNI-NPN, the UE has a subscription for the PLMN. Usually a network customer can request the PLMN to setup a PNI-NPN to use specific customer service. The network customer is called "NPN customer" in this description.

The UE can have a default subscription for a network (e.g., PLMN or SNPN provisioned in the UE and in the network). With the default subscription, the UE may be able to register to the PLMN for some default services, but the UE would not be able to use the NPN customer services. For example, the NPN customer can buy devices which are provisioned with default subscription for a given PLMN. In order to use the NPN customer services (e.g., provided via an PNI-NPN), the devices should be provisioned correspondingly to be able to use the NPN customer services.

In another scenario, the specific customer service (realized by PNI-NPN or a dedicated network slice) can be deployed in specific frequency band(s), e.g., a cell(s) in this frequency band may be reserved for one or more specific customer services (NPN services) realized by network slices. One of the attributes in the GST documented in GSMA 5GJA NG.116 is the "Radio spectrum" and it is defined as "This attribute defines the radio spectrum supported by the network slice. This is important information, as some terminals might be restricted in terms of frequencies to be used". This attribute can be used by network slice customer to requests which frequencies can be used to access the network slice.

The UE would have to attempt to select 5G-AN with no awareness as to whether a 5G-AN support a S-NSSAI till the S-NSSAI is allowed. However, one problem in such scenario is how to configure the UE with the specific frequency band(s) used for the specific customer service. For example, the UE has default subscription for a PLMN and needs to be provisioned with dedicated subscription/configuration parameters. Currently, the UE performs network selection procedure and cell selection procedure without considering the network slice support (or considering the network slice configuration in the network). However, it is unclear how to provision (i.e., reconfigure or onboard) the UE to enable the use of specific service (e.g., specific slice(s) for a NPN customer) efficiently with less impact to the 5GS system. Solutions for provisioning the UE are described below with reference to FIGS. 3A-3C.

Additionally, it is unclear how to avoid registration failures to specific services (e.g., specific S-NSSAIs/DNNs) due to failed secondary authentication and authorization. Solutions for avoid registration failures are described below with reference to FIGS. 4A-4C.

In 3GPP release 16, it was specified that a HPLMN can configure or re-configure a UE with Closed Access Group identifiers in order to access specific reserved radio cells used for the PNI-NPN. Closed Access Groups (CAGs) may be used to apply access control for PNI-NPN. A CAG identifies a group of subscribers that are permitted to access CAG cells. CAG is used to prevent UEs which are not allowed to access the PNI-NPN via the associated cells, from selecting and accessing the associated cells. The CAG information can be either 1) pre-provisioned in the UE or 2) configured in the UE using the UE Configuration Update procedure for access and mobility management related parameters described in TS 23.502 [3] in clause 4.2.4.2.

The present disclosure describes how subscription-related information (e.g., S-NSSAIs, DNNs, equivalent PLMNs, preferred frequencies per PLMN) can be provisioned in the UE. The proposed solution(s) is/are based on the following assumptions:

1) The UE has a default subscription/credentials which allow access to default services of a network (e.g., PLMN, or SNPN). This network can be called default subscription owner network.

2) The default subscription owner network (e.g., PLMN or SNPN) stores the default subscription/credentials allowing the UE to be authenticated and authorized to access default services, e.g., IP connectivity to Internet and SMS.

3) The default subscription owner network (e.g., PLMN, SNPN) has a service agreement with specific service customer (e.g., NPN customer or service) to update/provision some UEs to use the specific service.

The main idea of the solution is that the default subscription owner network (e.g., the PLMN's UDR or UDM) is configured with: 1) a list of default subscribers (UEs with default subscription) to be on-boarded for particular network service (e.g., where a NPN customer or slice customer is the service provider) and 2) new service subscription data specific to the network service customer. The new service subscription data can be stored separately from the default subscription data (i.e., the default subscription data corresponds to the current UE default configuration). The particular network service may require to use at least one of: dedicated S-NSSAI(s) or dedicated DNN or new allowed CAG list or new PLMN list.

FIG. 1 depicts a wireless communication system 100 for registering with a mobile network through another mobile network, according to embodiments of the disclosure. In one embodiment, the wireless communication system 100 includes at least one remote unit 105, at least one base unit 110, at least one access network ("AN") 115, a mobile core network 130 in a PLMN, and a non-public network ("NPN") service 140. The AN 115 may be composed of at least one base unit 110. The remote unit 105 may communicate with the access network 115 using 3GPP communication links and/or non-3GPP communication links, according to a radio access technology deployed by the AN 115. Even though a specific number of remote units 105, base units 110, ANs 115, mobile core networks 130, and NPN services 140 are depicted in FIG. 1, one of skill in the art will recognize that any number of remote units 105, base units 110, ANs 115, mobile core networks 130, and NPN services 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote unit 105 may be referred to as UE, subscriber unit, mobile, mobile station, user, terminal, mobile terminal, fixed terminal, subscriber station, user terminal, wireless transmit/receive unit ("WTRU"), a device, or by other terminology used in the art.

The remote units 105 may communicate directly with one or more of the base units 110 in the access network 115 via uplink ("UL") and downlink ("DL") communication signals. Furthermore, the UL and DL communication signals may be carried over the communication links 113. Note, that the access network 115 is an intermediate network that provide the remote units 105 with access to the mobile core network 130 and/or NPN services 140. Note that the NPN service 140 may be provided via the PNI-NPN 141, which is implemented via the access network 115 and the mobile core network 130. In some embodiments, the NPN service 140 may be provided via a standalone NPN (SNPN), which is not shown in FIG. 1.

In some embodiments, the remote units 105 communicate with an application server (or other communication peer) via a network connection with the mobile core network 130 and/or PNI-NPN 141. For example, an application in a remote unit 105 (e.g., web browser, media client, telephone/VoIP application) may trigger the remote unit 105 to establish a PDU session (or other data connection) with the mobile core network 130 using the access network 115. The mobile core network 130 then relays traffic between the remote unit 105 and the data network 150 (e.g., application server) using the PDU session. Note that the remote unit 105 may establish one or more PDU sessions (or other data connections) with the mobile core network 130. As such, the remote unit 105 may have at least one PDU session for communicating with the data network 150. The remote unit 105 may establish additional PDU sessions for communicating with other data network and/or other communication peers.

As discussed in further detail below, a signaling connection of a remote unit 105 with the mobile core network 130 may be used to register the remote unit 105 with the mobile core network 130. Specifically, the remote unit 105 may register with the mobile core network 130 using the signaling connection in order to receive updated configuration information for connectivity to the NPN service 140, as described in further detail below.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 115, that may include one or more controllers communicably coupled to one or more corresponding base units 110. These and other elements of radio access network are not illustrated but are well known generally by those having ordinary skill in the art. The base units 110 connect to the mobile core network 130 and NPN service 140 via the access network 115.

The base units 110 may serve a number of remote units 105 within a serving area, for example, a cell or a cell sector, via a communication link 113. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the communication links 113. The communication links 113 may be any suitable carrier in licensed or unlicensed radio spectrum. The communication links 113 facilitate communication between one or more of the remote units 105 and/or one or more of the base units 110.

In one embodiment, the mobile core networks 130 is the 5G core ("5GC") or the evolved packet core ("EPC"), which may be coupled to a data network (e.g., the data network 150, such as the Internet and private data networks, among other data networks). A remote unit 105 may have a subscription or other account with the public mobile core network 130. Additionally, the remote unit 105 may have a subscription or other account with the PNI-NPN 141. The present disclosure is not intended to be limited to the implementation of any particular wireless communication system architecture or protocol.

The mobile core network 130 includes several network functions ("NFs"). As depicted, the mobile core network 130 includes at least one user plane function ("UPF") 131 that serves the access network 115. The mobile core network 130 also includes multiple control plane functions including, but not limited to, an Access and Mobility Management Function ("AMF") 133, a Session Management Function ("SMF") 135, an Internal Provisioning Server ("I-PS") 136, a Policy Control Function ("PCF") 137, a Network Exposure Function 138, and a Unified Data Management/Unified Data Repository ("UDM/UDR") 139. In certain embodiments, the mobile core network 130 may also include an Authentication Server Function ("AUSF"), a Network Repository Function ("NRF") (used by the various NFs to discover and communicate with each other over APIs), or other NFs defined for the 5GC. The PNI-NPN 141 is implemented by the access network 115 and the mobile core network 130.

The PNI-NPN 141 is a public network integrated non-public network. Note that the PNI-NPN 141 may share spectrum with the PLMN, or may have separate operating frequencies than the PLMN. In various embodiments, the PNI-NPN 141 shares the RAN 115 with the PLMN, but maintains a separate core network than the mobile core network 130. Here, the PNI-NPN 141 may include one or more U-plane NFs and one or more C-plane NFs, described above. In certain embodiments, the PNI-NPN 141 also shares the control plane with the PLMN. Here, one or more C-plane NFs in the mobile core 130 may serve both the PLMN and the PNI-NPN 141. In certain embodiments, the PNI-NPN 141 also shares the user plane with the PLMN. Here, one or more U-plane NFs in the mobile core 130 may serve both the PLMN and the PNI-NPN 141. In certain embodiments, the PNI-NPN 141 is implemented as a network slice within the mobile core 130.

In various embodiments, the mobile core network 130 supports different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF 135 and a UPF 131, but the various network slices share the AMF 133, the PCF 137, and the UDM 139. In another example, each network slice includes an AMF 133, an SMF 135 and a UPF 131. Although specific numbers and types of network functions are depicted in FIG. 1, one of skill in the art will recognize that any number and type of network functions may be included in the mobile core network 130.

To provision a remote unit 105 (i.e., UE) with information for the NPN service 140, this disclosure proposes solutions that enable the remote unit 105 to receive updated configuration information after registering with the mobile core network 130. Note that the mobile core network 130 is the default subscription owner for the remote unit 105. In the various solutions, the UDM/UDR 139 or internal provisioning server (I-PS) 136 is configured with: 1) a list of default subscribers (UEs with default subscription) to be on-boarded for particular network service (e.g., where a NPN customer or slice customer is the service provider) and 2) new service subscription data specific to the network service customer. The new service subscription data may be stored separately from the default subscription data (i.e., the default subscription data corresponds to the current UE default configuration). The particular network service may require to use at least one of: dedicated S-NSSAI(s) or dedicated DNN or new allowed CAG list or new PLMN list.

The following examples or use cases are covered by the proposed solution(s): 1) The network slice customer (e.g., an enterprise (like utility company) or service provider) has subscribed to use the PLMN (or SNPN) services and dedicated network slice(s) are provided to the customer. 2) The NPN customer is using a PNI-NPN, e.g., a NPN service integrated in the PLMN. With other words, the PLMN identifies a remote unit 105 with a default subscription to be on-boarded for a new service (e.g., PNI-NPN). The PLMN (e.g., UDM/UDR 139) identifies the remote unit 105 to be on-boarded (based on the configured list) and the network (e.g., UDM/UDR 139) performs a procedure to update the remote unit 105 subscription parameters. 3) The NPN customer uses an SNPN which is managed by a PLMN operator. The remote unit 105's SNPN subscription data in the network is stored in the corresponding SNPN, but the PLMN may use its provisioning server (and other provision infrastructure) to provision the remote unit 105 with the subscription profile to use the SNPN. In all the above cases the subscription data of the remote unit 105 may be updated in the network while the remote unit 105 is not reachable, i.e., the remote unit 105 is in deregistered state.

During (initial or mobility) registration procedure, the UDM/UDR 139 may determine that a remote unit 105 is to be provisioned with information (parameters like S-NSSAI, DNN, cell selection info). The UDM/UDR 139 then triggers a UE Parameter Update procedure to configures the remote unit 105 with new UE configuration information. After receiving the new (updated) information, the remote unit 105 triggers re-registration procedure towards the mobile core network 130 in order to apply the new UE configuration information.

The new UE configuration information may include at least one of the following: A) New or to be updated S-NSSAIs; B) New or to be updated DNNs; C) Allowed CAG list; D) preferred frequencies for cell selection (or target carrier frequencies per S-NSSAI) in order to select the correct cell offering the specific service; and E) security parameters (identifier and security credentials) for a service subscription, i.e., associated with S-NSSAI/DNN. Note that the security parameters may be stored in the mobile core network 130 (i.e., in the UDM/UDR 139).

In various embodiments, if the vertical customer (e.g., NPN customer as 3rd party or PLMN own service) requires secondary authentication, or the remote unit 105's subscription profile needs to be updated (e.g., USIM provisioning), one of the following procedures may be used: A) The updated (e.g., service/vertical subscription) is activated in the network and provided to the UE after the UE is provisioned with security information for secondary authentication/authorization (SAA) or IMS authentication associated with the updated service subscription; B) The UDM determines whether U-plane or C-plane connection is desirable for the provision for the particular UE. Here, the provisioning connection type (U-plane or C-plane) may be determined based on the request from the provisioning server.

If the security parameters are provisioned from an external provisioning server (E-PS), the E-PS may subscribe for notification with the network (e.g., via NEF 138) when a remote unit 105 is reachable via the control plane. Upon receiving the notification for remote unit reachability, the E-PS initiates a procedure for UE ID/credential provisioning where the communication between the remote unit 105 and E-PS. In one embodiment, the data from the E-PS is provided similar to Non-IP Data Delivery ("NIDD") communication via NEF 138 and AMF 133.

Figure 2:
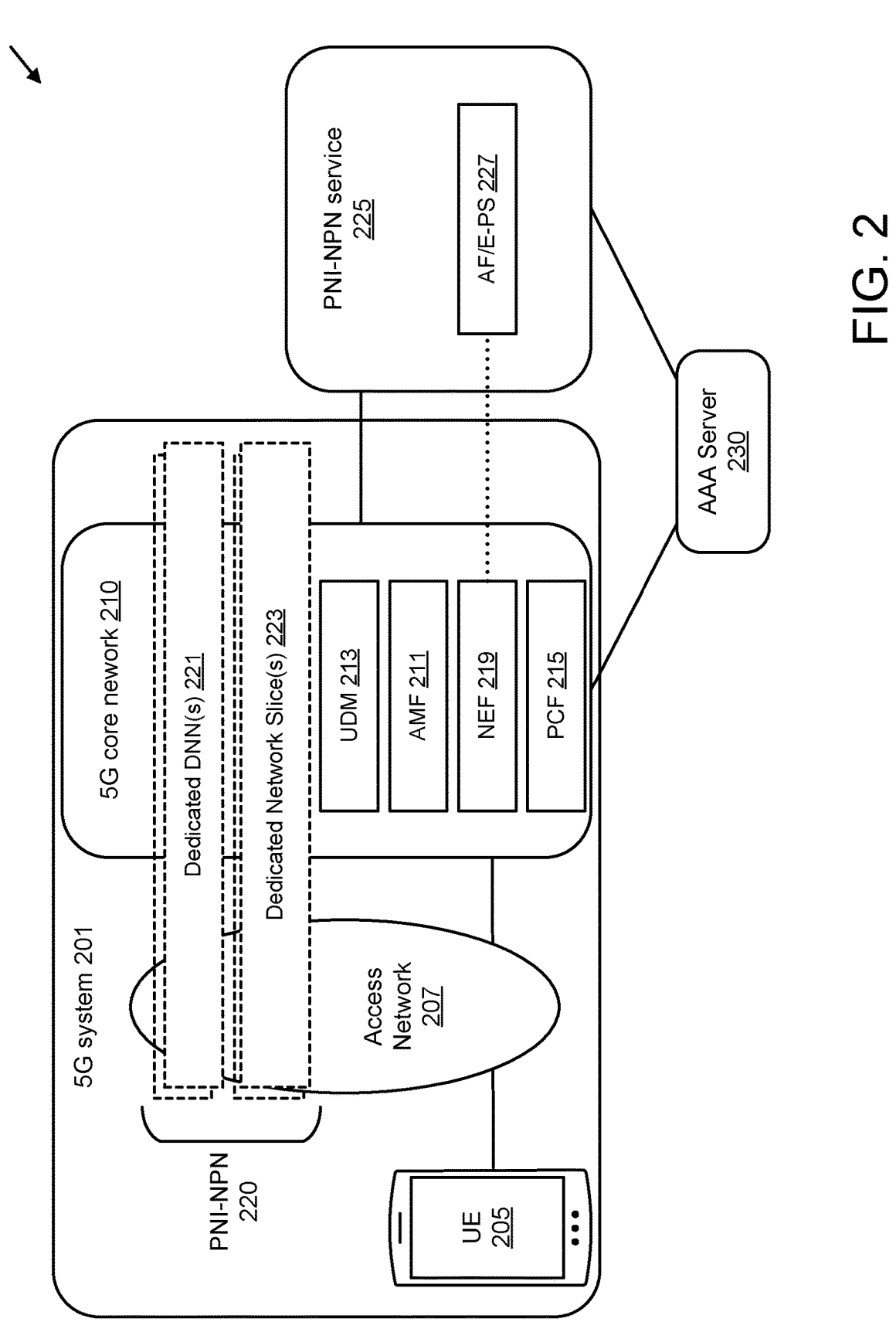
FIG. 2 is a diagram illustrating one embodiment of a network deployment for provisioning a UE with information to access a specific service.

FIG. 2 depicts a network deployment 200 comprising a UE 205 which registers with a 5G system 201 (i.e., PLMN) via the access network 207. The 5G system 201 is provisioned with new subscription data for the PNI-NPN 220. Recall that the PNI-NPN 220 may be deployed by means of dedicated data network names (DNNs) 221, or by one or more dedicated Network Slice instances 223 allocated for the NPN. In various embodiments, the PNI-NPN service 220 includes an Application Function and/or External Provisioning Server (shown as AF/E-PS 225) which provides service requirements to the 5G system 201. The service requirements are translated to subscription data and/or configuration parameters in the 5GS. Updated subscription data and NPN configuration parameters may be stored in the UDM 213. The PCF 215 may derive policy rules, i.e., UE Route Selection Policy ("URSP") rules using the updated subscription data and/or NPN-specific configuration parameters. When the UE 205 registers with the 5G system 201 via the AMF 211, the UDM 213 and AMF 211 provision the UE 205 with updated configuration information as described in greater detail below with reference to FIGS. 3A-3C and 4A-4C. The updated configuration information enables the UE 205 to use the specific service.

The UE 205 may receive updated configuration information including frequency resources associated with network slice identity (to be stored in the subscription information and/or in the ME configuration data). Additionally, the UE 205 may perform cell (re-)selection procedure (considering the frequency resources for the selected slices to be requested) and initiating a registration procedure to request access to the selected slices.

The AMF 211 may receive a request for an equipment ID (e.g., for PEI from the UDM 213) and replying with the equipment ID of the UE 205. The AMF 211 may be configured (e.g., via OAM system, or from the NSSF) with frequency information associated with a network slice ID. The AMF 211 may derive new slicing configuration information to be sent to the UE 205, whereas the slicing configuration information includes at least a frequency priority associated with network slices. The AMF 211 may defer (i.e., omit) an NSSAA (for the subscribed S-NSSAIs which require NSSAA) if the AMF 211 sends new configured NSSAI to the UE 205 requiring re-registration of the UE 205. As a result, the AMF 211 also omits including the pending NSSAI in the Registration Accept message.

The UDM 213 may receive (e.g., from OAM system or NEF 219) and maintain at least one of the following information: 1) a list of device identities (e.g., UEs identified via SUPIs, PEI, MSISDN, or External ID) for provisioning with a subscription information for specific (vertical or NPN) service; 2) a second type of subscription information (e.g., subscription information for the specific service) to enable the UE 205 to use the specific service.

The UDM 213 may determine that a UE 205 is a subject for provisioning by mapping the signaling exchange during registration procedure (e.g., subscription retrieval from AMF 211) with the received list of identities. The UDM 213 may determine whether U-plane or C-plane provisioning is to be used. The UDM 213 may perform UE Parameters Update procedure with the new configuration information based on the service subscription information.

Figure 3A:
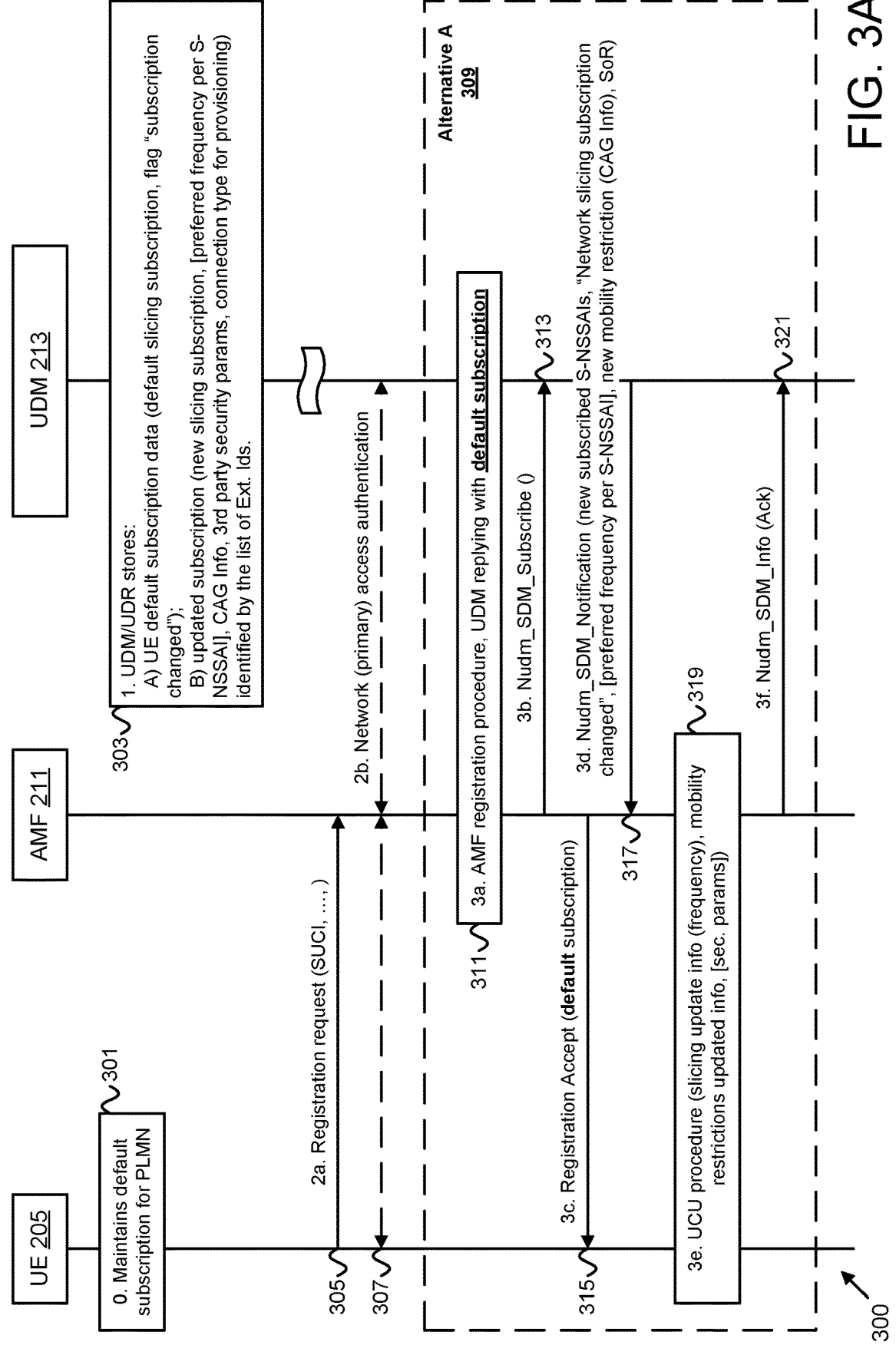
FIG. 3A is a signal flow diagram illustrating one embodiment of signaling for provisioning the UE according to a new service subscription data.
Figure 3B:
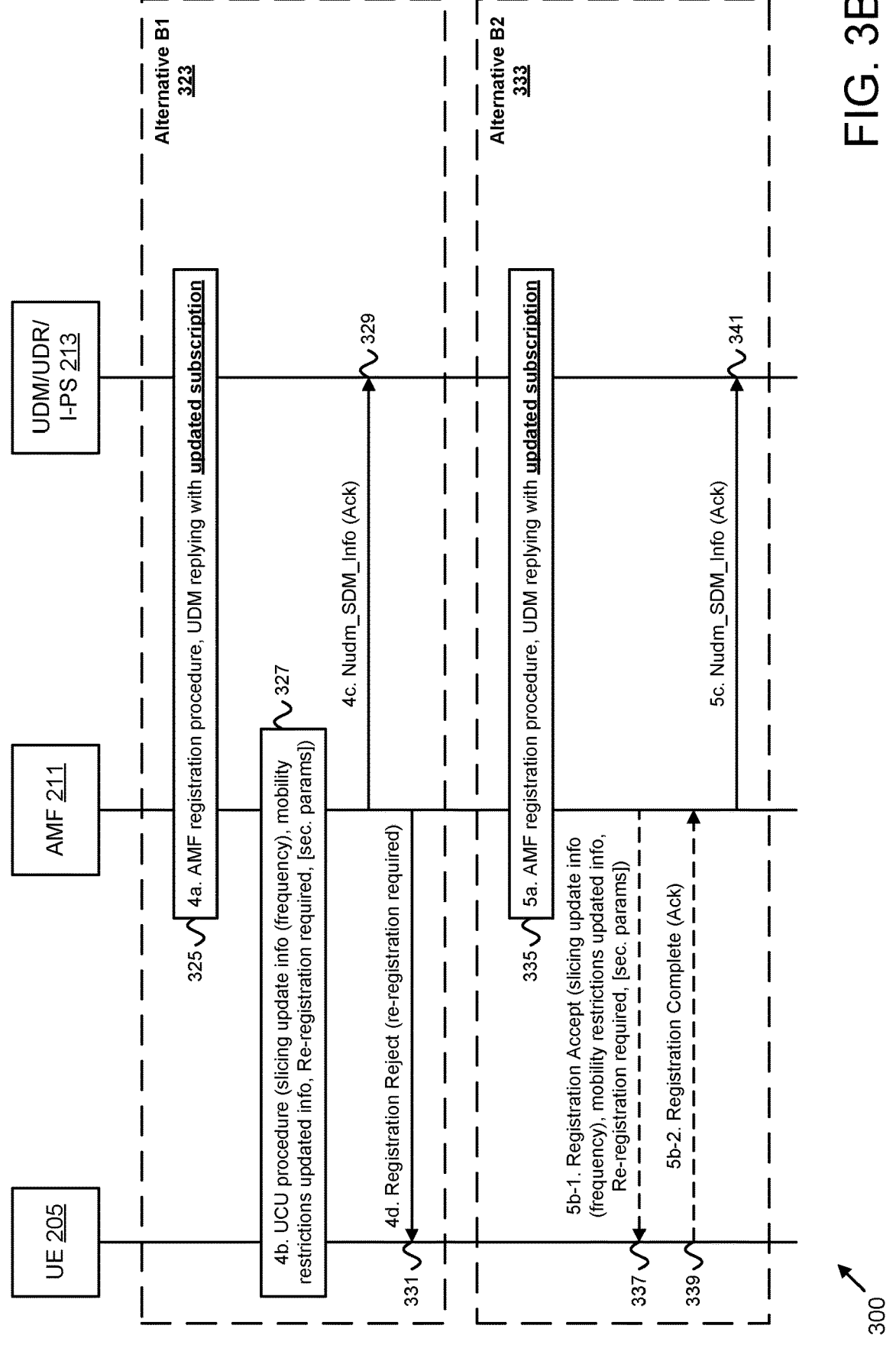
FIG. 3B is a continuation of the procedure depicted in FIG. 3A.
Figure 3C:
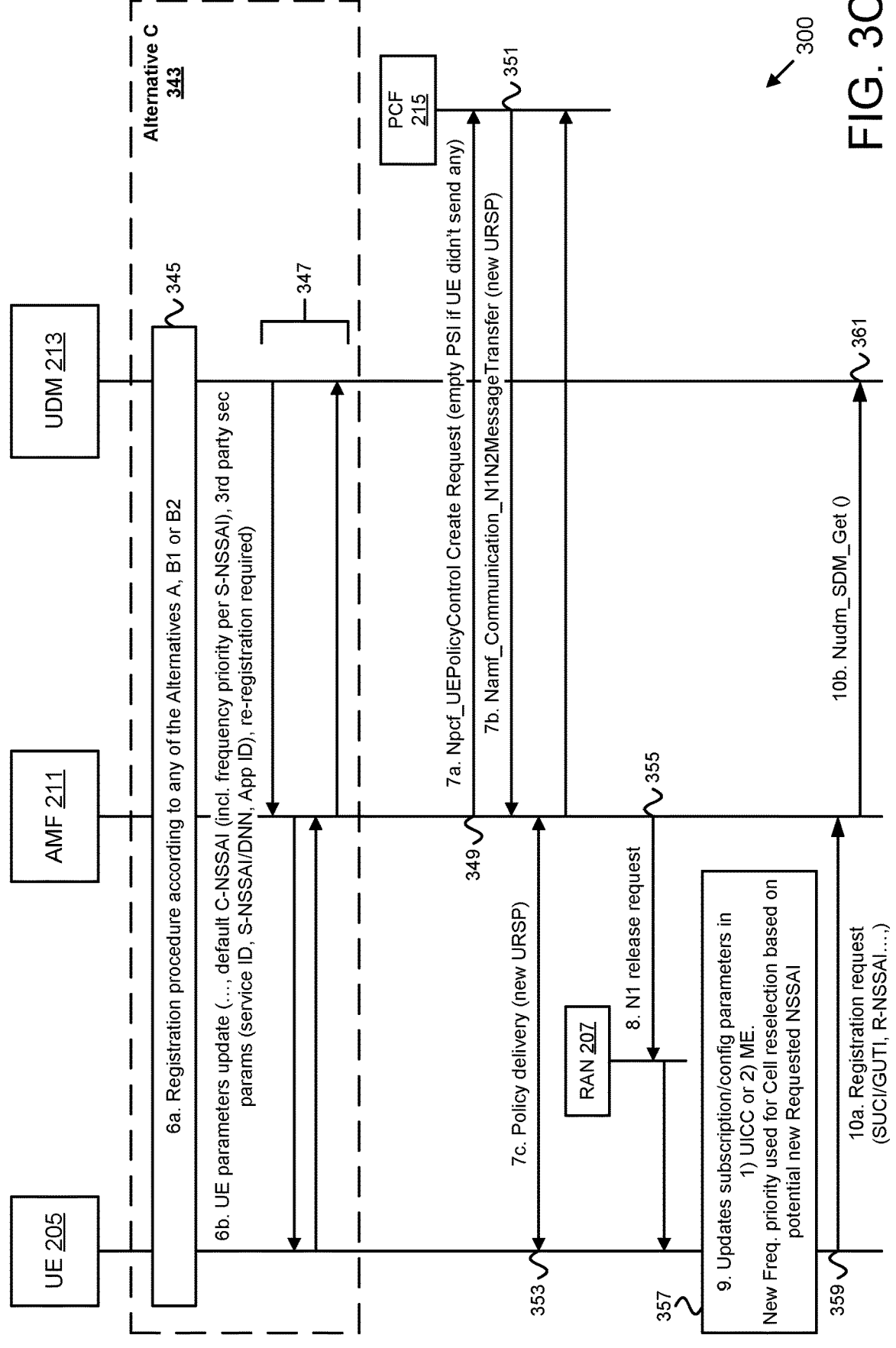
FIG. 3C is a continuation of the procedure depicted in FIGS. 3A-3B.

FIGS. 3A-3C depict a procedure 300 for provisioning a UE 205 with information to access a specific service, according to embodiments of the disclosure. The procedure 300 involves the UE 205 (e.g., one embodiment of the remote unit 105), the RAN 207, the AMF 211, the UDM 213, and the PCF 215. The procedure 300 details signaling flow for how the UE 205 can be configured (or re-configured) based on the specific service subscription data. Notes that FIGS. 3A-3C shows various alternatives how the UE 205 can be (re-)configured based on the specific service subscription data (corresponding to the vertical subscription in the UDM 213). The selection which alternative to apply depends on the decision of the UDM 213 when to trigger the UE service subscription update procedure.

Note that the application function ("AF") or external provisioning server ("E-PS") are meant to represent vertical/service provider, e.g., network slice customer like enterprise or NPN customer. Note that the E-PS can be also viewed as an AF from the 5GS point of view. The AF can be located in 3rd party (e.g., outside the serving network domain) to which the network operator may or may not have a trust relationship.

Referring to FIG. 3A, the procedure 300 begins at Step 0 where the UE 205 stores (i.e., maintains) a subscription for a PLMN (see block 301). This subscription (USIM profile) can be referred as default subscription and may be stored either in UICC (eUICC) or in secure storage (secure element) in the ME part of the UE 205. The default subscription allows the UE 205 to use a default service in the PLMN (or in the networks of roaming partners). For example, the UE 205 can obtain an IP connectivity to Internet, SMS service, and/or other control plane service(s).

At step 1, the network (5GC, or UDM, or UDR, or internal provisioning (USIM) server) is configured with a subscription information (see block 303). Here, the subscription information contains at least the following: 1) default subscription which corresponds to the default subscription profile in the UE and 2) second type of subscription information to provide a specific service to a one or more UEs. It is assumed that the network (i.e., RAN, 5GC NFs) has been configured (e.g., by the OAM system) to offer the corresponding network slice (identified by an S-NSSAI) and/or data network (identified by an DNN). Details of the provisioning/configuration of the network with the service subscription information is described below with reference to FIG. 4A.

The service subscription (e.g., vertical subscription information) is associated with one or more: service ID; associated S-NSSAI(s) and/or DNN(s); external IDs of the UEs (e.g., which are to be provisioned/updated). Alternatively, an external group ID can be used whereas the external group ID is associated with the group of UEs to be provisioned/updated. The external ID can have the form of: A) global or external subscriber identity; or B) hardware identity. Examples of global/external subscriber identity include: Generic Public Subscription Identifier (GPSI) and Mobile Subscriber Integrated Services Digital Network Number (MSISDN, e.g., a telephone number). Here, the external ID can be in form of Network Access Identifier, NAI, with a syntax similar to "user@realm." Examples of hardware identity include: International Mobile Station Equipment Identity (IMEI) and permanent equipment identity (PEI). The specific behavior, if hardware identity is used as external ID, is described below. The details how the UDM 213 is provisioned with the service subscription can be seen in step 1 in FIG. 2.

The UDM 213 stores at least one of the following: Option 1: The UDM 213 stores both A) the UE default subscription data and B) the updated subscription data are stored separately. By storing or handling the two types of subscription data separately, the UDM 213 is able to apply the default subscription data first to allow successful UE registration with the default subscription profile. Afterwards, the UDM 213 can trigger the subscription data update procedure towards the AMF including the subscription data update with service subscription.

Option 2: the UE subscription data as updated based on step 1. The subscription data has a flag "subscription changed" which is to be indicated to the AMF.

The vertical subscription information can contain at least one of the following: slicing subscription information [including preferred frequency per S-NSSAI], mobility restrictions (allowed CAG information), connection type [C-plane or U-plane] for USIM provisioning. Some of the vertical subscription information can be relevant to UE and network (i.e., should be provided to UE and AMF) and other vertical subscription information can be relevant to UE only.

In case of the UE only relevant vertical subscription information, independent from Option 1 or Option 2, the UDM 213 can provide the resulting configuration/provisioning information to the UE. This information may be at least one of the following: default configured NSSAI, security parameters (associated with particular application or slice/DNN), default connection type [C-plane or U-plane] for provisioning the UE USIM or provisioning security parameters associated with a UE's application. The provision of the UE only relevant vertical subscription information to the UE is shown in step 5 (Alternative D).

At step 2a, the UE initiates a registration procedure towards the selected network based on the default USIM data in the UE 205 (see messaging 305). If this is an initial registration request, the UE would include the SUCI. At step 2b, the network (e.g., AMF and AUSF) performs the network (i.e., primary) access authentication and authorization procedure (see messaging 307). In one embodiment, the network performs primary access authentication and authorization procedure as specified in 3GPP TS23.501/TS33.501.

Steps 3 show signaling for Alternative A 309 for UE configuration according to the service subscription data. At step 3a, the AMF retrieves the UE subscription from the UDM 213 (see block 311). The current AMF may retrieve a partial UE subscription data (e.g., the access and mobility subscription data or network slicing subscription data) in order to determine whether the current AMF can serve the UE and whether AMF relocation is needed. The AMF uses the Nudm_SDM_Get operation. If AMF relocation is required due to the subscribed S-NSSAIs, the current AMF performs AMF relocation to a target AMF. The target AMF (or the current AMF in case no AMF relocation is needed) retrieves the whole UE subscription data (shown in step 5a).

In Alternative A 309, the UDM 213 provides the default subscription, i.e., the subscription data corresponding to the default configuration in the UE. The UDM replies with Nudm_SDM_Get response sending the UE subscription data. The UDM may send the default UE subscription data to the AMF, i.e., without including the vertical subscription information. In such case, the UDM keeps an internal flag that the UE's subscription data is to be updated later (e.g., in step 3d). For example, such later time point can be upon successful registration procedure. The UDM would trigger the UE subscription data update (Notification request) sent to the serving AMF after the AMF successfully registers as serving AMF with the UDM.

At step 3b, at some point after successful registration, the AMF 211 informs the UDM 213 that the AMF 211 is the serving AMF for this UE 205 and the AMF 211 subscribes for further notification related to subscription data (see messaging 313). The AMF 211 may use the Nudm_SDM_Subscribe( ) service operation to subscribe for further notifications.

At step 3c, the AMF 211 sends registration accept message to the UE 205 including the required configuration according to the default subscription, e.g., allowed NSSAI, mobility restrictions, etc. (see messaging 315).

At step 3d, the UDM 213 initiates the UE subscription update procedure in order to send updated subscription information to allow the use of the specific service(s) by the UE 205. In certain embodiments, the UDM 213 uses the Nudm_SDM_Notification service operation (see messaging 317). Here, message parameters include the new subscribed S-NSSAIs, a "Network slicing subscription changed" indication, new mobility restriction (i.e., CAG Info), and steering of roaming (SoR) information. In one embodiment, the preferred frequency per S-NSSAI is included in the messaging 317.

In addition, the UDM 213 may send in transparent container to be sent to the UE 205, where the container contains 1) default configured NSSAI and including preferred frequency per S-NSSAI and/or 2) security parameters of a UE's application (e.g., security parameters associated with particular application or S-NSSAI and/or DNN). The container (security parameters) is delivered transparently to the UE 205.

At step 3e, the AMF 211 triggers a UE Configuration Update (UCU) procedure to update the UE configuration (see block 319). The UCU command sent from the AMF 211 to the UE 205 may include at least: a new enhanced configured NSSAI (for this PLMN) including the preferred frequency information per S-NSSAI, mobility restrictions (e.g., with updated CAG information), default connection type [C-plane or U-plane] for provisioning the UE USIM or provisioning security parameters of a UE's application, (if received in step 3d) the transparent container as received from the UDM (e.g., including the security parameters), request for re-registration, and others.

In certain embodiments, the UCU command sent to the UE 205 does not contain allowed NSSAI, as the UE is supposed to immediately perform registration procedure, where the UE may send a requested NSSAI according to the configured NSSAI. The allowed NSSAI received in step 3c can be used in the UE 205. Further details are described in step 4b.

If the updated configured NSSAI (i.e., applicable for this PLMN) and/or the updated CAG information does not match with the frequency or CAG configuration of the current cell, to which the UE is currently connected, then the UE 205 enters limited service state in RM registered state in the current cell. The UE 205 then attempts cell reselection procedure as described below in step 9.

Note that the AMF 211 is also able to determine the preferred frequency information per S-NSSAI. In one embodiment, the AMF 211 determines the preferred frequency bands by network configuration in the AMF 211. In another embodiment, the AMF 211 interrogates with the NSSF and the NSSF then provides the preferred frequency information per S-NSSAI. If the current AMF 211 is serving the UE's subscribed S-NSSAIs, as received in the updated subscription in step 3d, the AMF 211 is able to determine the preferred frequency bands per S-NSSAI. If the current AMF is not able to serve the updated subscribed S-NSSAIs, then the current AMF may trigger AMF re-location procedure to a target AMF. The preferred frequency information may be a parameter including a list of target carrier frequencies (or frequency bands) containing one or more entries, and for each entry a carrier frequency priority index may be associated as well (e.g., the priority index indicating the priority for scanning/selecting of a carrier frequency). Please note that not all S-NSSAIs, which are part of the list of subscribed S-NSSAIs (and used to determine the configured and allowed NSSAI), may be associated with preferred frequency information. For example, the UE 205 may be subscribed to S-NSSAI #a and 5-NSSAI #b, but only S-NSSAI #b may be associated with preferred frequency information.

The default (or provisioning) connection type (i.e., C-plane or U-plane) is used by the UE 205 when requesting a PDU Session for provisioning the USIM or for provisioning security parameters of a UE's application. The provisioning connection type indication/parameter can contain multiple elements or values, e.g., control-plane or user-plane, DNN, S-NSSAI. The provisioning connection type parameter may also contain a data network name (DNN) or network slice ID (e.g., S-NSSAI) to be used for the data connection (e.g., PDU Session) used for provisioning the UE 205. The UE 205 may include one or more of the connection type parameter elements in the NAS MM or NAS SM message (or both) when requesting connection for provisioning (e.g., sending a PDU Session establishment request message). The provisioning connection type parameter elements, i.e., [C-plane or U-plane], S-NSSAI and/or DNN, may be also enforced in the network (e.g., in the AMF 211) when the UE 205 triggers data connection establishment. In such case the AMF 211 applies the parameter elements for this data connection.

At the UE 205, upon receiving the security parameters (associated with an application and/or slice/DNN), the UE's NAS layer forwards the security information to the higher layer (e.g., associated application like EAP client in the UE 205) and also including the associate S-NSSAI or DNN. The security information can be used the UE's application for different purposes, e.g., 1) for NSSAA procedure; or 2) to establish secure connection with the AF/E-PS 225 for provisioning the UE 205, or IMS registration as described in further detail below.

At step 3f, the AMF 211 notifies the UDM 213 whether the UE Configuration Update procedure has been successful or failed (see messaging 321). This step is considered as reply to the 3d where the UDM 213 may have requested an acknowledgement about the successful update of the UE 205. The AMF 211 can use the Nudm_SDM_Info (Ack) service operation.

Continuing at FIG. 3B, steps 4 show signaling for Alternative B1 323 for UE configuration according to the service subscription data. At step 4a, the AMF 211 retrieves the UE subscription from the UDM 213 similar to step 3a (see block 325). In the Alternative B1, the UDM 213 determines to reply with the updated UE subscription data. Accordingly, the UDM 213 sends a Nudm_SDM_Get response including the UE subscription data.

In one embodiment, the UDM 213 may send the updated UE subscription data to the AMF 211. The updated UE subscription data may contain either 1) a general indication that the UE subscription data has been updated or 2) one or more dedicated indications that the slicing data (e.g., subscribed S-NSSAIs and related preferred frequency bands per slice), mobility restrictions data (e.g., CAGs) or other has been updated.

Similar to step 3d, the UDM 213 may send: new subscribed S-NSSAIs, a "Network slicing subscription changed" indication, new mobility restriction (CAG Info), SoR info, and transparent container including security parameters. Optionally, the Nudm_SDM_Get response may include the preferred frequency per S-NSSAI.

Where the UDM 213 is aware about the connection type for USIM/security provisioning of the UE 205, the UDM 213 may provide such indication to the AMF 211. This indication is used in the AMF 211 to determine whether to apply C-plane or U-plane PDU session upon establishment of a (default) PDU Session from the UE 205 as described in step 3e.

At step 4b, the AMF 211 determines to update the UE configuration before completing the registration procedure (i.e., before sending the registration accept/reject message). The AMF 211 initiates the UCU procedure during the registration procedure (see block 327). In such case, the UCU procedure is integrated in the registration procedure. The content of the UCU command sent to the UE 205 and further handling are as described above in step 3e.

In certain embodiments, the UCU command sent to the UE 205 does not contain allowed NSSAI, as the UE 205 is supposed to immediately perform registration procedure, where the UE 205 may send a requested NSSAI according to the configured NSSAI included in the UCU command. With other words, if the AMF includes updated configured NSSAI to the UE and there are no established PDU Sessions, the AMF may omit including the allowed NSSAI in the UCU command message, as it is expected that the UE initiates the registration procedure immediately completing the UCU procedure. At step 4c, the AMF 211 sends an acknowledgement to the UDM 213 (see messaging 329), as discussed above at step 3f.

At step 4d, the AMF 211 send registration reject message to the UE 205 (see messaging 331). The reason to reject the registration is because the UE 205 cannot access the subscribed services (e.g., specific service subscribed S-NSSAI) via the current cell or tracking area (TA). In certain embodiments, the registration reject message may include an indication that re-registration is required. Note that the NAS registration reject message is usually not acknowledged by the UE 205, and therefore, the update of the slicing configuration (e.g., configured NSSAI) or mobility restrictions configuration (e.g., allowed CAG list) is not possible because the UE cannot acknowledge the configuration. Optionally, the registration reject message may include a new specific reject cause (e.g., NAS 5GMM reject cause) indicating to the UE the reason for rejections, e.g., the subscribed services/S-NSSAIs cannot be accessed via the current cell/TA and cell-resection is needed.

Steps 5 show signaling for Alternative B2 333 for UE configuration according to the service subscription data. At step 5a, the AMF 211 retrieves the UE subscription from the UDM 213 similar to step 4a (see block 335). Again, the UDM 213 determines to reply with the updated UE subscription data in the Alternative B2.

At step 5b-1, the AMF 211 completes the registration procedure based on the received subscription information in step 5a (see messaging 337). If the AMF 211 is provided with an indication that network slicing subscription data has changed and one or more subscribed S-NSSAIs and one or more of the subscribed S-NSSAIs require NSSAA, the AMF 211 may determine to skip the NSSAA procedure and to omit including the Pending NSSAI in the Registration Accept message. The AMF 211 may skip including the "NSSAA to be performed" indicator to the UE.

If the AMF 211 determines that a new configured NSSAI (with or without including the frequency information per S-NSSAI) has to be sent to the UE 205 and registration (re-registration) is required immediately after the registration procedure, the AMF 211 may skip sending the allowed NSSAI to the UE 205 (similar to step 4*b*). The reason is that the UE 205 will use the new configured NSSAI to build a Requested NSSAI in the consequent Registration procedure, thus the allowed NSSAI is not immediately needed. In one embodiment, the AMF 211 skips sending the (default) allowed NSSAI by instead sending an empty parameter (i.e., "empty" allowed NSSAI).

The AMF 211 sends Registration Accept message to the UE 205. The Registration Accept message may contain at least one of: allowed NSSAI (i.e., default or empty), configured NSSAI (including frequency priorities per S-NSSAI which are part of the configured NSSAI), network slice subscription change indication, mobility restrictions (CAG Info), SoR information, provisioning connection type (i.e., C-plane or U-plane) for provisioning the UE USIM or provisioning security parameters of a UE's application, transparent container including security parameters (associated with particular application or slice/DNN).

If the current cell or tracking area where the UE 205 initiates the registration cannot be used for any of the subscribed S-NSSAIs, but there are other cell(s) or tracking area(s) in the vicinity, the AMF 211 may decide to include empty registration area parameter in the registration accept message.

At step 5*b*-2, the UE 205 can acknowledge the successful reception of the Registration Accept message or indicate failure (see messaging 339). The AMF 211 may further indicate to the UDM 213 that the UE 205 has been successfully updated. At step 5*c*, the AMF 211 sends an acknowledgement to the UDM 213 (see messaging 341), as discussed above at steps 4*c* and 3*f*.

As it will be apparent from the above description, the commonality of the Alternatives B1 and B2 is that the UDM 213 provides the updated UE subscription data (including the service subscription data) to the AMF 211. The updated UE subscription data requires to provide configuration update to the UE 205. The main difference between the alternatives B1 and B2 is the way/sequence how the AMF 211 provides the configuration update to the UE 205: in Alternative B1 the AMF 211 decides to first update the UE configuration before rejecting the registration procedure, whereas in Alternative B2 the AMF 211 decides to successfully complete the registration procedure and update the UE configuration within the registration accept message or immediately afterwards by UCU procedure.

The AMF 211 may determine whether to apply B1 or B2 depending on at least one of the following conditions: 1) the current AMF may serve the updated subscribed S-NSSAIs, e.g., if the current AMF cannot serve the UE 205 and a new AMF is needs to be selected, the current AMF determines to apply alternative B1 in order to allow the selection of new AMF upon re-registration procedure; and 2) the current cell allows the UE 205 to use the updated subscribed S-NSSAIs or updated CAG-information.

For example, if the updated UE subscription parameters (e.g., subscribed S-NSSAIs with corresponding frequency priorities or CAG-information) require the UE 205 to reselect another cell, the AMF 211 may determine to apply alternative B1 because the UE 205 cannot be registered in the current cell or tracking area. In cases where the current AMF may serve the UE 205 with the updated UE subscription data or current cell or tracking area can be used, the AMF 211 may apply alternative C, described below.

Continuing at FIG. 3C, steps 6 show signaling for Alternative C 343 for UE configuration according to the service subscription data. At step 6*a*, the UE 205 and the network perform a registration procedure according to any of the Alternatives A, B1 or B2 (see block 345). If specific UE service subscription data has to be updated, the UDM 213 may have sent the data to the AMF 211 as shown in the alternatives A, B, or C. However, the UDM 213 may need to update the UE 205 with UE-specific parameters which do not impact the network behaviour/configuration.

At step 6*b*, the UDM 213 initiates the UE Parameters Update procedure (see messaging 347). One example of a UE Parameters Update procedure is described in clause 4.20 of 3GP TS23.502. The UDM 213 includes the UDM update data (UUD, including new or updated UE parameters) in a container encapsulated in the Nudm_SDM_Notification service operation towards the AMF 211. The UUD is delivered transparently to the UE over NAS signaling. The UUD contains at least one of the following new parameters: new or updated subscribed S-NSSAIs, new or updated subscribed DNNs, allowed CAG list; preferred frequencies for cell selection in order to select the correct cell offering the specific service, provisioning connection type, and security parameters. The UUD may in addition contain whether the UE 205 needs to send an acknowledgement to the UDM 213 and whether the UE 205 needs to re-register after updating the data.

The AMF 211 includes the received UUD into a DL NAS TRANSPORT message to the UE 205. The UE 205 verifies the received UUD, i.e., that the UDM Update Data is provided by trusted UDM 213 in the HPLMN. In one embodiment, the verification is based on mechanisms defined in 3GPP TS 33.501. After successful verification, the UE 205 either stores the information and uses those parameters from that point onwards, or forwards the information to the USIM.

The security parameters are associated with an application ID or network slice (e.g., S-NSSAI) or DNN, i.e., the parameters/container signaled from the UDM 213 include one of the association parameters, e.g., application ID, S-NSSAI or DNN. The UDM 213 may obtain the security parameters containing the user ID and credentials; and the UDM 213 may create association of security parameters with application ID, S-NSSAI or DNN. For example, the UDM 213 may use the service ID_(as described in step 1) to associate the security parameters with S-NSSAI(s) and/or DNN(s).

The UE 205 may send an acknowledgement to the UDM 213 about the successful update of the UE subscription/configuration parameters. Upon reception of the acknowledgement the UDM 213 can reset the flag that the UE subscription data needs to be updated.

At step 7*a*, the AMF 211 requests the PCF 215 to create UE policy control information, e.g., the UE policy may include URSP information (see messaging 349). For example, the AMF 211 can use Npcf_UEPolicyControl Create Request (empty PSI if UE didn't send any). If the AMF 211 has not received any PSI from the UE 205, or if the AMF 211 has received UE subscription update from the UDM 213 and the subscription update impacts the subscribed S-NSSAIs/DNNs (e.g., during step 5*b*), the AMF 211 includes "empty PSI" in order to indicate that new UE policy should be provided to the UE 205. This allows the update the URSP in the UE 205 including the updated subscribed S-NSSAIs/DNNs.

In step 7*b*, the PCF 215 may send to the AMF 211 a Namf_Communication_N1N2MessageTransfer message including the new URSP information (see messaging 351). In step 7*c*, the AMF 211 transmits the updated URSP information to the UE 205 (see messaging 353).

At step 8, the AMF 211 requests the 5G-AN (RAN 207 or non-3GPP access node) to release the connection to the UE 205 in order to allow the UE 205 to transfer to Idle mode (see messaging 355).

At step 9, the UE 205 updates its subscription/configuration parameters either 1) the USIM in the (e)UICC or 2) the subscription stored in the ME (see block 357) and/or the NAS layer configuration. The UE 205 applies the new updated subscription/configuration information. The UE 205 determines which S-NSSAIs it wants to register with, i.e., the S-NSSAIs to be included in the requested NSSAI. Then, the UE 205 performs cell selection procedure considering the frequency priority for the S-NSSAIs to be included in the requested NSSAI.

The UE 205 may first create a requested NSSAI (e.g., based on the configured NSSAI) to be included in the second registration request message. The UE 205 may then consider the list of target carrier frequencies for the S-NSSAI values included in the requested NSSAI. If there are more than one S-NSSAIs in the requested NSSAI, then the UE 205 may prioritize the S-NSSAIs, and consequently, prioritize the carried frequencies (frequency bands) to be used for cell selection. The prioritization of S-NSSAIs is up to UE internal configuration (e.g., from higher layers) or user priorities.

At step 10, the UE 205 initiates the registration procedure in cell selected according to step 9 and the UE 205 constructs the Registration Request by applying the updated subscription/configuration parameters (see messaging 359). The AMF 211 proceeds with registering the UE 205 using the updated subscription/configuration parameters, i.e., the AMF 211 retrieves the UE subscription from the UDM 213 using the Nudm_SDM_Get service operation (see messaging 361). While the depicted embodiment shows the AMF 211 receiving the second registration request, note that the AMF receiving the second registration request may be an AMF different from AMF 211, which depends on the requested NSSAI used in the second registration request.

Note that the UE 205 may be provisioned with (non-3GPP) "security parameters" by the 5GC during the steps 6 (Alternative C); or alternatively during steps 3, 4 or 5. In other embodiments, the security parameters may be provisioned from a third-party server, as discussed below with reference to FIGS. 4A-4C. The "security parameters" can be a 3rd party parameters/credentials. The "security parameters" include at least: User ID, at least one of [security token, password, certificate, or other credential] and association with a 3GPP service ID (e.g., an application ID or S-NSSAI/DNN) or with an external 3rd party service ID (discussed below with reference to FIGS. 4A-4C).

The security parameters can be applicable to 1) a group of UEs, e.g., the group of UEs to be provided with the specific service, and in such case this is a group security; or 2) each individual UE 205, i.e., each UE 205 has its own security parameters to be used. If the security parameters are applicable to individual UEs, then in step 1 the AF is to use individual external IDs for each UE 205 to provision the data to the network and the UDM/UDR should store the security parameters associated with the individual default UE subscription.

As the security parameters may be used for secondary authentication with external service/vertical providers, they can be also called non-3GPP security parameters. The association of the security parameters with a 3GPP service ID (e.g., an application ID, S-NSSAI or DNN) is used in the UE 205 to identify, for which authentication procedure to apply the provisioned security parameters. For example, there may be multiple sets of security parameters, whereas each set is associated with a distinct service ID (e.g., application ID, S-NSSAI or DNN); and the UE 205 determines to use a particular set of security parameters based on the 3GPP service ID.

The "security parameters" can be used at least for one of the following purposes: A) establishing a secure connection to an AF/E-PS (e.g., for onboarding, provisioning or update of the USIM or secure storage subscription); or B) for secondary authentication and/or authorization ("SAA") for S-NSSAI (aka NSSAA) or PDU Session; or C) for IMS registration, e.g., for IMS authentication and authorization for using the IMS services. Note that for A), the secure storage may be a secure element (SE) within the devices for the storage, management and operations of the subscriptions and credentials (including either 3GPP credentials or non-3GPP credentials or both). For C), security parameters used as IMS credentials may be different from the USIM-based IMS credentials. Such security parameters can be used for registration with NPN's IMS system. Details of SAA per option B) are discussed below with reference to FIGS. 4A-4C.

If the service subscription (e.g., vertical subscription information, as in step 1) is associated with an external IDs in the form of equipment identity (e.g., PEI or IMEI), then the UDM 213 can request the AMF 211 to provide the PEI/IMEI of the UE 205. The request from UDM 213 to the AMF 211 can be performed during the UE subscription data retrieval by the AMF 211, e.g., as shown in steps 3a, 4a or 5a. If the AMF 211 does not know the PEI/IMEI of the UE 205, the AMF 211 can perform the UE identity request procedure with the UE 205. The AMF 211 provides the UE equipment identity to the UDM 213.

Alternatively or additionally to sending to frequency priorities per S-NSSAI as are part of the configured NSSAI (e.g., as shown in the steps 3f, 4b, 5b or 6b in the procedure 300), the AMF 211 may include the frequency priorities per S-NSSAI in the allowed NSSAI information. The frequency priorities per S-NSSAI can be used in the UE 205 to derive the frequency as additional criterium to be used in Idle mode for cell selection purposes. The UE 205 can be in Idle mode for re-registration (as shown in step 8 and 9 in the procedure 300), but also the UE 205 can be registered to the 5GS and perform Idle state mobility, where the UE 205 uses the frequency preference per network slice during service request procedure. Such mechanism can be described as network slice based cell selection where the UE 205 performs slice selection taking into consideration the frequency priorities per S-NSSAI as additional slice selection criteria (in addition to the signal strength and other cell selection criteria).

One example scenario can be: UE 205 is registered for network slices S-NSSAI #a (having preferred frequency "band a") and S-NSSAI #b (having preferred frequency "band b"), whereas both "band a" and "band b" are part of the same registration area. Assume that the UE 205 camps currently on cell using frequency "band a", e.g., because the signal strength of "band a" is higher than "band b." If an application associated with an S-NSSAI #b triggers a service request procedure, then the UE 205 may determine to select a cell operating in frequency "band b" before initiating the RRC connection establishment. The UE 205 initiates then the RACH procedure and RRC connection establishment procedure in the cell operating in frequency "band b."

Please note that some of the Alternatives A, B1, B2 and C may be used simultaneously (or consequently within the same registration procedure or in consecutive registration procedures). For example, any of the Alternatives A, B1, B2 may be used to configure the network slice information (e.g., configured NSSAI, etc.) and mobility restrictions (e.g., allowed CAG IDs), whereas the security parameters can be sent to the UE 205 using alternative C. In general, the security parameters, default configured NSSAI, which are relevant to the UE 205 only, can be sent to the UE 205 using alternative C, whereas other parameters having both UE 205 and network impact (e.g., subscribed S-NSSAI, allowed CAG IDs) may be provisioned via one of the alternatives A, B1 or B2.

Beneficially, the procedure 300 enhances the UEs configuration update by providing additional information to the UE 205 (e.g., frequency information per slice, or security parameters). The solution in FIGS. 3A-3C also allow to use an equipment identity from (e.g., 3rd party) AF to identify a subscription (or group of subscriptions) in the network.

Figure 4A:
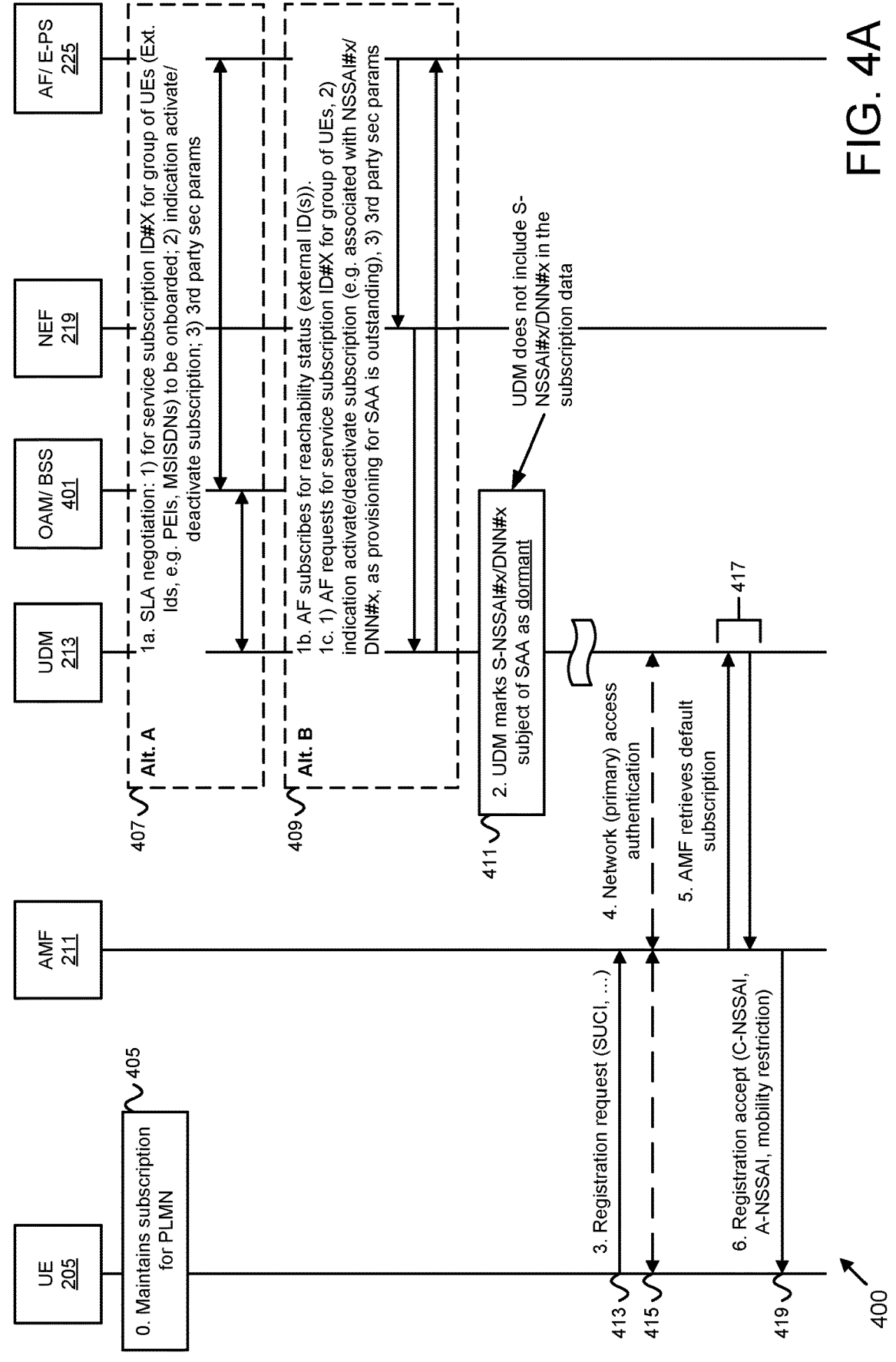
FIG. 4A is a signal flow diagram illustrating one embodiment of signaling flow for activating/deactivating the UE service subscription.
Figure 4B:
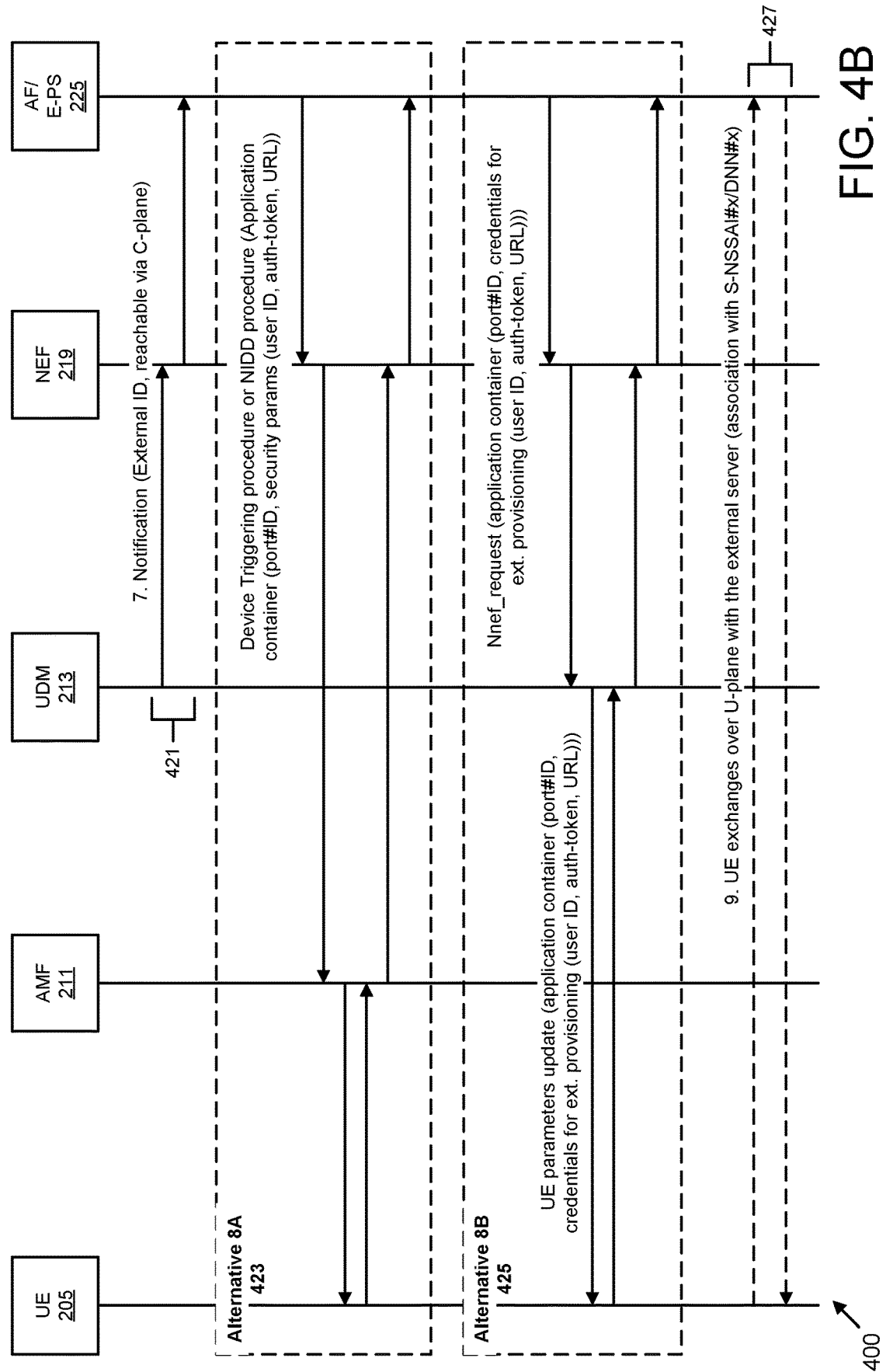
FIG. 4B is a continuation of the procedure depicted in FIG. 5A.
Figure 4C:
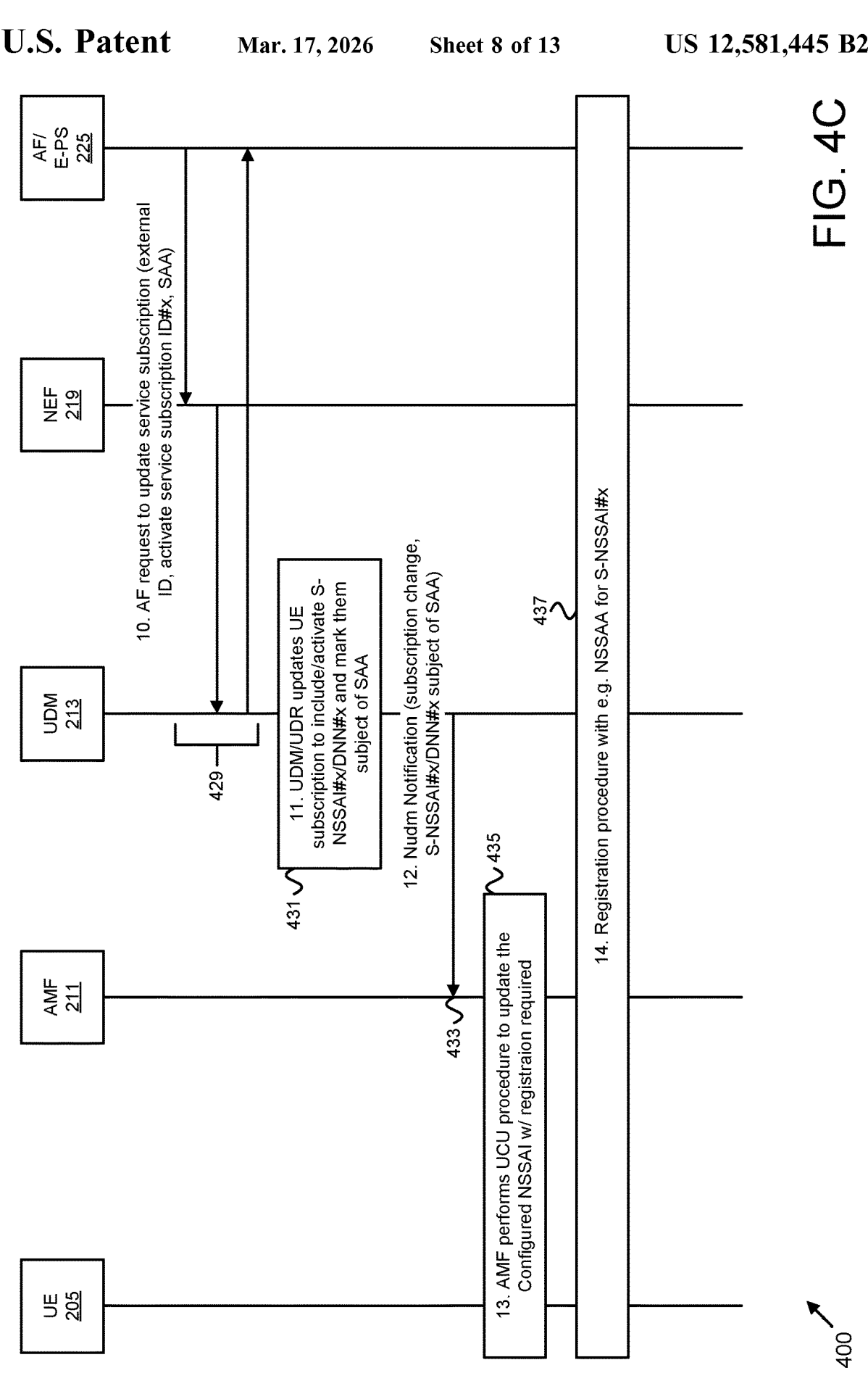
FIG. 4C is a continuation of the procedure depicted in FIGS. 5A-5B.

FIGS. 4A-4C depict a procedure 400 for registering with a mobile network through another mobile network, according to embodiments of the disclosure. The procedure 400 involves the UE 205, the AMF 211, the UDM 213, a Business Support System ("BSS") 401 in the Operations Administration and Management ("OAM") plane (referred to as "OAM/BSS" 401), the NEF 219, and the AF/E-PS 225. The procedure 400 details signaling flow for the Solution B where the UE 205 is connected to a 4G-Residential Gateway (5G-RG) 405 in PLMN-1 and registers via this 4G-RG 405 with a PLMN-2. The PLMN-1 provides an IP tunnel that enables the communication between the UE and the PLMN-2, in a similar way as the SNPN in the Solution A provides an IP tunnel that enables the communication between the UE 205 and the PLMN.

Secondary authentication and authorization ("SAA") may be applied during registration (e.g., performed by the AMF and called network slice secondary authentication and authorization, NSSAA, associated with an S-NSSAI) or during the PDU Session establishment (performed by the SMF and associated with DNN, called secondary authentication for PDU Session). If the UE 205 does not hold the security credentials for SAA, the SAA procedure would fail. This results in the problem where the AMF/SMF would start the SAA procedure, but it will fail because the UE does not even hold the User ID associated with the S-NSSAI/DNN subject of SAA. Please note that alternatively, the security parameters may be used for IMS registration instead of SAA procedure; and the same signaling flow as in FIG. 4A-4C can be used.

The procedure 400 details signaling flow to solve this problem by not activating (or not provisioning in the network and corresponding UE configuration is performed) the UE service subscription data (e.g., related to specific/vertical service ID #x and associated with S-NSSAI(s) or DNN(s) denoted as S-NSSAI #x/DNN #x, for which SAA is required) unless the corresponding security parameters are provisioned to the UE 205. In various embodiments, the state of the specific service subscription data (in the UDM 213) is dormant (or deactivated). Consequently, the specific service subscription data (e.g., S-NSSAI #x/DNN #x) is not sent in the subscription data to other NFs (e.g., to the AMF 211) while dormant.

Another feature of the solution is that the activation of the service subscription in the UDM 213 can be performed dynamically by the AF/E-PS 225 via the exposed network provisioning capabilities (e.g., via the N33 interface between the NEF 219 and AF/E-PS 225). For example, an AF may use the N33 interface service to activate or deactivate the service identified by ID #x. Such exposed network provisioning capabilities are new and need to be supported by the network (e.g., NEF, UDM/UDR) and AF.

One alternative way to activate the service subscription is a semi-static approach where the AF/E-PS 225 requests the activation or deactivation of the service ID #x (S-NSSAI #x/DNN #x) via the OAM system.

Furthermore, this solution proposed an alternative to FIGS. 3A-3C how the provisioning of the security parameters to the UE can be performed. It is proposed that the 3rd party server (e.g., Application Function (AF) or external provisioning server, E-PS) can use a N33 interface service. This N33 interface service may be an existing service, or a new service.

FIG. 4A-4C describe the details of this embodiment. Note that the procedure 400 can be also applied to provisioning the UE 205 with further information (i.e., beside the security parameters). For example, if the 3rd party server is a provisioning server (e.g., E-PS) having access to the UE's subscription data, the 3rd party server may also provision a new subscription profile or change existing subscription profile in the UE 205 and the subscription information in the network (e.g., UDM/UDR 139).

At FIG. 4A, the procedure 400 begins at Step 0 where the UE 205 stores (i.e., maintains) a subscription for a PLMN (see block 405). This subscription (USIM profile) can be referred as default subscription and may be stored either in UICC (eUICC) or in secure storage in the ME part of the UE 205. The default subscription allows the UE 225 to use a default service in the PLMN (or in the networks of roaming partners). For example, the UE 205 may obtain an IP connectivity to Internet, SMS service, and/or other control plane service(s).

At Step 1, the service provider (e.g., AF/E-SP 225) has a contract with the network operator to provide specific service(s) to a group of devices/UEs. The AF/E-PS 225 learns the external IDs of UEs/subscribers which should use the service. The service identifier can be allocated as well, e.g., service ID #x. The reason to use service ID #x is because there can be multiple services with different service characteristics and subscriptions of the same AF/E-SP 225. The following Alternative A and Alternative B show different possible communication methods between AF/E-SP 225 and UDM 213.

Alternative A (Step 1*a*): The AF/E-PS 225 uses the service-level agreement ("SLA") to request a service subscription (see block 407). Usually the SLA is stored at the OAM/BSS 401. The OAM/BSS 401 may configure the UDM 213 with the vertical subscription information. In addition, the AF/E-SP 225 may negotiate with the network operator (e.g., mobile network operator, MNO) whether the service subscription should be activated or deactivated. Note that in FIGS. 3A-3C, it is assumed that the service subscription is activated; however, in case of FIGS. 4A-4C, it is assumed that the service subscription is not provisioned in the corresponding UEs subscription data (although negotiated with the MNO). With other words the service subscription is deactivated or dormant. The network (UDM 213) is provisioned with a default subscription data for the UE 205 and only the default subscription data is active in the UDM 213.

Alternative B (Steps 1*b* and 1*c*): The AF/E-PS 225 requests provisioning for a one UE or a group of UEs to be allowed to use specific NPN/vertical service(s), e.g., using the N33 exposed network services. The UE or group of UEs are identified by External ID or list of UE External IDs or Group External ID. In addition, the AF/E-PS 225 can provide a provisioning connection type (e.g., Control-plane or User-plane) which can be used to provision the UE 205 (e.g., the UE's USIM) from the provisioning server. The AF/E-PS 225 can also provide 3rd party (group) security parameters to be sent to the UDM 213 for provisioning authentication. The AF/E-PS 225 is able to establish an association with the NEF 219 of the network (e.g., PLMN or NPN). The AF/E-PS 225 performs at least one of the Steps 1*b* and 1*c* (see block 407).

At Step 1*b*, the AF/E-PS 225 subscribes with the 5GS (e.g., UDM 213) to be notified when a UE (identified by external ID) becomes reachable. Recall that external IDs are discussed above with reference to FIG. 3A. In Step 1*c*, the AF/E-PS 225 indicates to 5GS (e.g., target is UDM 213) that service subscription has to be created or updated. In one embodiment, the AF/E-PS 225 uses the Nnef_Parameter-Provision_Create service operation to the NEF 219 to create or update the service parameters. In another embodiment, the AF/E-PS 225 uses the Nnef_ParameterProvision_Update service operation to the NEF 219 to update the service parameters. In other embodiments, the AF/E-PS 225 uses the Nnef_ParameterProvision_Delete Request service operation to the NEF 219 to update the service parameters to the NEF 219.

For any of the alternative A or B, the following information can be sent from the AF/E-PS 225 to the network: 1) service identifier (e.g., service ID #x, this is used in order to identify the service between the service provider (AF/E-PS 225) and the network operator); 2) a list of one or more external IDs of the UEs (e.g., associated with the specific service), or an external group ID; 3) an explicit indication whether the service should be activated or deactivated. One reason for deactivation can be the outstanding provision of security parameters; 4) Service subscription parameters, which e.g., may be like generic slice template (GST) attributes as specified in GSMA 5GJA NG.116. Such parameters are used by the network (e.g., OAM system) to instantiate or configure or provision the RAN and core network with the needed network slice and/or data network parameters; and 5) 3rd party security parameters (e.g., as described above with reference to FIGS. 3A-3C).

As an example of explicit indication, the AF service can be associated with S-NSSAI (e.g., S-NSSAI #x) and/or data network name (e.g., DNN #x) which are subject of secondary authentication and authorization (SAA). The security parameters are not provisioned yet in the UE 205 or should be provisioned to the UE 205. This is an indication to the UDM 213 that the corresponding S-NSSAI #x/DNN #x should be "inactive" in the subscription data, i.e., should not be included in the UE subscription data sent to other NFs.

At Step 2, the UDM 213 stores at least the following states: 1) the notification to the AF/E-PS 225 is required when the UE 205 becomes reachable; and 2) the S-NSSAI #x/DNN #x should be "inactive" in the subscription data, i.e., should not be included in the UE subscription data sent to the NFs (see block 411).

At Step 3, the UE 205 initiates a registration procedure towards the selected network based on the default USIM data in the UE 205 (see messaging 413). If this is an initial registration request, the UE 205 would include the SUCI. At Step 4, the network (e.g., AMF 211 and AUSF) performs the network (i.e., primary) access authentication and authorization procedure (see messaging 415). In one embodiment, the network performs primary access authentication and authorization procedure as specified in 3GPP TS23.501/ TS33.501.

At Step 5, the AMF 211 retrieves the default subscription from the UDM 213 (see messaging 417). In some embodiments, UDM 213 keeps an internal flag that the UE's subscription data is to be updated later. The AMF 211 may use the Nudm_SDM_Get operation to retrieve the subscription data. Additional details are described above, e.g., in Step 3*a* of FIG. 3A. At Step 6, the AMF 211 sends registration accept message to the UE 205 including the required configuration according to the default subscription, e.g., allowed NSSAI, mobility restrictions, etc. (see messaging 419).

Continuing at FIG. 4B, at Step 7 the UDM 213 notifies the AF/E-PS 225 about the UE reachability via the NEF 219 (i.e., indicating that the UE 205 is reachable over the control-plane ("C-plane"); see messaging 421). At Step 8, the AF/E-PS 225 initiates a C-plane procedure to either 1) update the UE with security parameters for SAA provisioning over the U-plane or 2) performs the SAA provisioning over the C-plane.

Depicted are two alternative procedures for the C-plane procedure. In alternative 8A (see block 423): the communication between the AF and UE is on the path AF<-->NEF<-->AMF<-->UE. In alternative 8B (see block 425): the communication between the AF and UE is on the path AF<-->NEF<-->UDM<-->UE; here, the signaling between the UDM 213 and UE 205 is via the AMF 211 and is similar to the UE Parameters Update procedure described above with reference to FIG. 3C, step 6*b*. In optional Step 9, if required, the UE 205 (e.g., an application in the UE 205) may trigger U-plane procedure to provision the security parameters needed for the SAA (see messaging 427). In one alternative to step 9, the AF/E-PS 225 may trigger the provisioning of a new subscription profile or change existing subscription profile in the UE 205.

It is also possible that the AF/E-PS 225 triggers the application layer signaling to provision the UE 205. The security credentials parameters may be referred as non-3GPP security parameters, as they are not used for primary authentication. As these parameters may be provisioned via legacy protocols, these parameters may not be associated with the service subscription of the UE. In the UE 205, the security parameters are to be associated with a service subscription identified by service ID (e.g., application ID, S-NSSAI, DNN or other ID) in order to allow the UE 205 to differentiate among multiple sets of security parameters. The AF/E-PS 225 may learn the service ID for the subscribed service during step 1 when the service is provisioned in the network. In such case, the AF/E-PS 225 includes the service ID in the U-plane signaling exchange.

Alternatively, in case that the AF/E-SP 225 is not aware about the 3GPP service ID (e.g., application ID, S-NSSAI, DNN) used in the 3GPP network, but the AF/E-SP 225 uses its own 3rd party service ID (which can be the same as the user ID, or proprietary application ID), then the security parameters sent to the UE 205 in step 9 contain the 3rd party service ID. The 3rd party service ID is provided to the 5GC (3GPP network) during step 1 and stored in the UDM 213 along with the service subscription. The 3rd party service ID is provided to the UE 205 in one of the following ways:

A) The 3rd party service ID may be used in the network slice configuration (e.g., configured NSSAI or allowed NSSAI or URSP rules), so that the UE 205 can establish the association between the 3rd party service ID and the 3GPP service ID (e.g., S-NSSAI or DNN).

B) During the trigger of the SAA procedure, the 3GPP network functions (e.g., AMF or SMF or AUSF) which triggers the SAA procedure includes in the authentication request the 3rd party service ID (along with the S-NSSAI or DNN). Please note that usually the authentication request is encapsulated in NAS protocol data unit, NAS PDU. Upon reception of the authentication request, the UE 205 uses the 3rd party service ID to map the authentication request to the stored security parameters identified by the same 3rd party service ID.

Continuing at FIG. 4C, in Step 10, after the successful provision of the credentials for SAA or the new/updated subscription profile in the UE 205, the AF/E-PS 225 initiates a procedure to update the service subscription status in the UDM 213, namely to "activate" the service subscription ID #x in the UE's subscription data (see messaging 429). For this purpose, the AF/E-PS 225 can use either 1) the N33 interface services towards the NEF 219 (as shown in the FIG. 4C); or 2) communication via the OAM system (not shown in the FIG. 4C, but similar to step 1a in FIG. 3A).

The information sent from AF/E-PS 225 can include at least: external ID of a UE; service ID; indication to activate the service subscription for the UE; indication to activate the SAA for the corresponding S-NSSAI or DNN; target AAA server information (e.g., FQDN or IP address); etc. Note that the indication to activate the service subscription for the UE 205 corresponds to the indication in steps 1a or 1c to deactivate the service subscription. For example, this indication or parameter may have at least 2 values, e.g., "on" and "off". Alternatively, if the AF/E-SP 225 has created a new subscription profile in the UE 205, the AF/E-SP 225 may create a new subscription data in the UDM 213. It is noted that the subscription profile in the UE 205 and the subscription data in the UDM 213 are identified by subscriber identity (e.g., SUPI).

At Step 11, the UDM 213 updates (or activates, or creates) the service subscription associated with identifier ID #x in the UE 205 subscription data (see block 431). The UDM 213 is able to map the service subscription identifier ID #x with the corresponding parameters 5-NSSAI #x/DNN #x used in the EPS to differentiate network function(s) configured to use the specific service. The UDM 213 updates the parameters S-NSSAI #x/DNN #x in the UE's subscription data. In addition, the UDM 213 marks the S-NSSAI #x/DNN #x with an indication subject of SAA, which is used in the target network function (e.g., AMF 211 or SMF 145) to trigger the SAA procedure towards the UE 205.

At Step 12, the UDM 213 initiates procedure to update the UE subscription data in the corresponding NFs (see messaging 433). For example, the UDM 213 initiates update towards the AMF by using the Nudm Notification service operation. The UDM 213 includes an indication that the network slicing subscription has changed and the new list of subscribed S-NSSAIs together with the indication whether SAA (i.e., NSSAA) is required.

At Step 13, the AMF 211 performs UCU procedure towards the UE 205 to update the network slice configuration (e.g., configured NSSAI, allowed NSSAI) with registration required (see block 435). The UCU procedure may be substantially as described above with reference to step 3e of FIG. 3A. At Step 14, after applying internally the updated configuration and possibly performing cell reselection, the UE 205 performs Registration procedure including an update Requested NSSAI (see messaging 437). The target AMF (if AMF relocation is required) performs the NSSAA procedure for the S-NSSAI #x.

The benefit to perform the UE's service subscription update via the exposed network capability (e.g., control plane interface N33) is that the service provider can update individually the subscription of a particular UE after the particular UE has been onboarded/configured on the application level (e.g., with security parameters for SAA or new/updated subscription profile). This kind of coordination between the activation of service subscription and provisioning of the UE avoids the necessity to perform NSSAA procedure or PDU session secondary authentication which would fail, as the UE has not been provided with the related security parameters.

Figure 5:
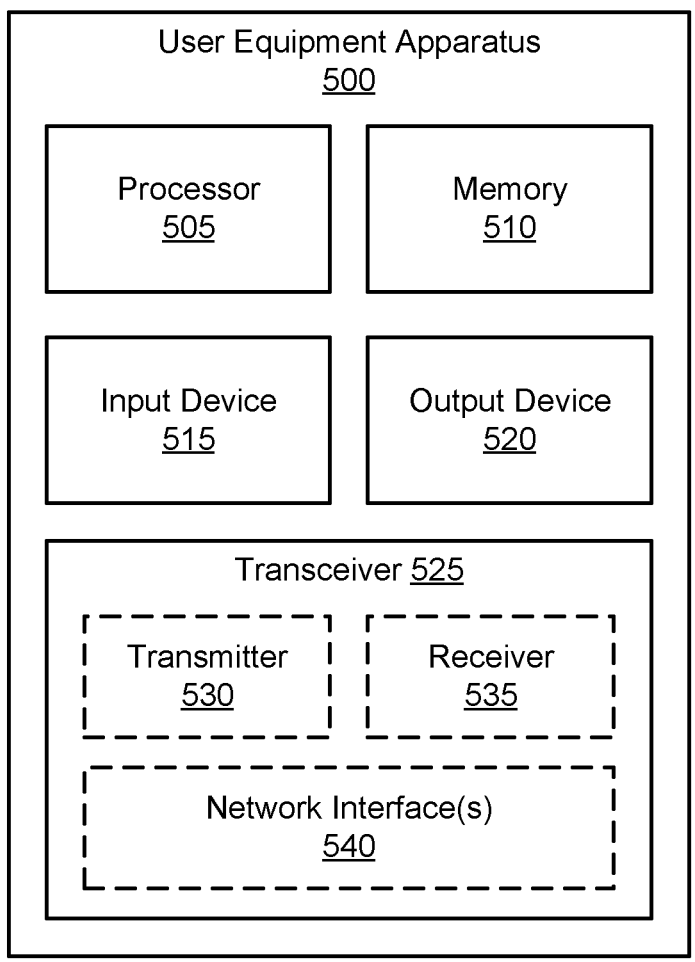
FIG. 5 is a block diagram illustrating one embodiment of a user equipment apparatus for provisioning a UE with information to access a specific service.

FIG. 5 depicts one embodiment of a user equipment apparatus 500 that may be used for registering with a mobile network through another mobile network, according to embodiments of the disclosure. The user equipment apparatus 500 may be one embodiment of the remote unit 105 and/or the UE 205. Furthermore, the user equipment apparatus 500 may include a processor 505, a memory 510, an input device 515, an output device 520, a transceiver 525. In some embodiments, the input device 515 and the output device 520 are combined into a single device, such as a touch screen. In certain embodiments, the user equipment apparatus 500 does not include any input device 515 and/or output device 520.

As depicted, the transceiver 525 includes at least one transmitter 530 and at least one receiver 535. Here, the transceiver 525 communicates with a mobile core network (e.g., a 5GC) via an access network. Additionally, the transceiver 525 may support at least one network interface 540. Here, the at least one network interface 540 facilitates communication with an eNB or gNB (e.g., using the "Uu" interface). Additionally, the at least one network interface 540 may include an interface used for communications with an AMF, an SMF, and/or a UPF.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. In some embodiments, the processor 505 controls the transceiver 525 to send a first registration request to the mobile communication network, the mobile network supporting a plurality of network slices. Via the transceiver 525, the processor 505 receives configuration information from the mobile communication network, the configuration information enabling the user equipment apparatus 500 to use a specific service (e.g., at least one network slice from the plurality of network slices). In one embodiment, the configuration information includes a frequency priority for the at least one network slice. In another embodiment, the configuration information may include a frequency priority for each of the plurality of network slices. The processor 505 performs cell reselection using at least the frequency priority and sends a second registration request to the mobile communication network after performing the cell reselection. In one embodiment, the second registration requests to register with the at least one network slice.

In some embodiments, the configuration information includes network slice configuration data and mobility restrictions configuration data including cell restriction for closed access group. Here, the network slice configuration data includes allowed network slice information and (i.e., enhanced) configured network slice information for the mobile communication network. In such embodiments, receiving the configuration information may include receiving the information from an AMF in the mobile communication network.

In some embodiments, the configuration information includes frequency priorities for (i.e., default) configured network slice information. In some embodiments, the configuration information includes at least one security parameter for secondary authentication, the at least one security parameter including: an identifier, a credential, an association with a service identifier. Here, the service identifier may be a S-NSSAI, a DNN and/or an application.

In certain embodiments, the processor stores 505 the received configuration information in a subscription profile (e.g., in USIM). In other embodiments, the processor 505 stores the received configuration information in a mobile equipment configuration (e.g., at the NAS layer or at an application).

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to registering with a mobile network through another mobile network, for example storing security contexts, IP addresses, and the like. In certain embodiments, the memory 510 also stores program code and related data, such as an operating system ("OS") or other controller algorithms operating on the user equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
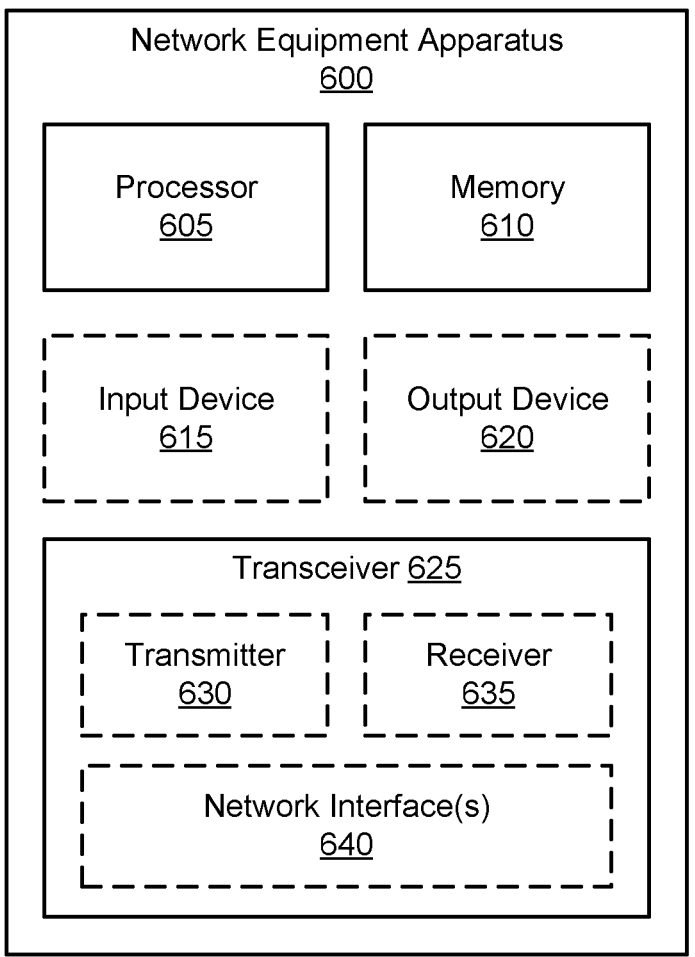
FIG. 6 is a block diagram illustrating one embodiment of a network equipment apparatus for provisioning a UE with information to access a specific service.

FIG. 6 depicts one embodiment of a gateway apparatus 600 that may be used for registering with a mobile network through another mobile network, according to embodiments of the disclosure. In some embodiments, the gateway apparatus 600 may be one embodiment of a 5G-RG. Furthermore, gateway apparatus 600 may include a processor 605, a memory 610, an input device 615, an output device 620, a transceiver 625. In some embodiments, the input device 615 and the output device 620 are combined into a single device, such as a touch screen. In certain embodiments, the gateway apparatus 600 does not include any input device 615 and/or output device 620.

As depicted, the transceiver 625 includes at least one transmitter 630 and at least one receiver 635. Here, the transceiver 625 communicates with one or more remote units 105. Additionally, the transceiver 625 may support at least one network interface 640, such as the N1 interface depicted in FIG. 4. In some embodiments, the transceiver 625 supports a first interface for communicating with a RAN node, a second interface for communicating with one or more network functions in a mobile core network (e.g., a 5GC) and a third interface for communicating with a remote unit (e.g., UE).

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the first transceiver 625.

In various embodiments, the processor 605 controls the network equipment apparatus 600 to implement the above described AMF behaviors. In some embodiments, the transceiver 625 receives a first registration request to register a UE with a mobile communication network. The processor 605 receives subscription information for the UE from the mobile communication network, the subscription information enabling the UE to use a specific service. The processor 605 determines configuration information to be provisioned to the UE. Here, the configuration information includes at least a frequency priority for each of the plurality of network slices. The processor 605 provisions the UE with the configuration information and receives a second registration request from the UE in response to provisioning the UE.

In some embodiments, the processor 605 determines whether to provision the UE before a registration result is sent to the UE or to provision the UE together with the registration result. In some embodiments, the processor 605 provisions the UE with the configuration information by performing a UE Configuration Update procedure. In certain embodiments, the processor 605 sends a Registration Reject message to the UE in response to performing the UE Configuration Update procedure, wherein the Registration Reject message triggers cell reselection and re-registration of the UE to the same mobile communication network.

In some embodiments, the processor 605 registers the UE in response to the first registration request. In such embodiments, registering the UE includes receiving default subscription information for the UE, wherein the default subscription information is for a default service (i.e., not including the specific service subscription). In certain embodiments, the default subscription information is updated by the subscription information enabling the UE to use a specific service. In such embodiments, the processor

605 subscribes with the mobile communication network (i.e., UDM) for notifications for the UE subscription and receives the updated subscription information for the UE, wherein the updated subscription information includes the subscription information for the specific service. In some embodiments, the subscription information includes the configuration information with a frequency priority for each of the plurality of network slices.

In some embodiments, the processor 605 provisions the UE with the configuration information by sending a registration accept message. In certain embodiments, the registration accept message includes an empty set of allowed network slices. In certain embodiments, at least one subscribed network slice requires secondary authentication. In such embodiments, the processor 605 skips a secondary authentication procedure (i.e., NSSAA procedure) after sending the registration accept message. Because S-NSSAIs which are subject to NSSAA are included in parameter "pending NSSAI" in the Registration Accept message, in one embodiment, skipping the secondary authentication procedure includes omitting the "Pending NSSAI" parameter in the Registration Accept message.

In some embodiments, the configuration information includes mobility restrictions configuration data including cell restriction for closed access groups and at least one transparent container containing a security parameter for secondary authentication of the UE, the security parameter including at least one of: an identifier, a credential, an association with a service identifier. Here, the service identifier may be a S-NSSAI, a DNN and/or an application. In certain embodiments, the configuration information configures the second apparatus, e.g., by updating the closed access group IDs of allowed NSSAI.

In some embodiments, the processor 605 receives a container with updated UE parameters after successful registration and forwards the container with updated UE parameters to the UE, wherein the updated UE parameters includes at least one of: (i.e., enhanced) default configured network slice information and security parameters, wherein the default configured network slice information includes a frequency priority for each of the plurality of network slices. Note here that containers are used because the parameters received from the UDM are not processed in the AMF, but transparently forwarded towards the UE. Note that using the container to sends updated UE parameters can be performed independent of whether the UE needs to re-register, i.e., is can be performed after successful one-shot registration of the UE.

In some embodiments, a service subscription of the UE is associated with an equipment identity of the UE, wherein the processor 605 receives a request to provide an additional UE identity and provides the equipment identity of the UE to the network.

In various embodiments, the processor 605 controls the network equipment apparatus 600 to implement the above described UDM/UDR behaviors. In some embodiments, the processor 605 stores subscription information for a UE. The processor 605 stores at least default subscription information for the UE and updated subscription information for a UE. Here, the default subscription information enables the UE to access a default service (see, e.g., Step 1a of FIG. 3A) and the updated subscription information enables the UE to use a specific service. Because both types of subscription information are stored, the UDM is able to activate or deactivate the updated [service] subscription data dynamically, e.g., upon request from the AF (e.g., as per steps 1c and 10 of FIGS. 4A-4C). The processor 605 receives a request from the AMF for subscription data of the UE and determines that the UE requires provisioning and determining a type of subscription data to transmit to the AMF. Here, the type of subscription data may be the default subscription information or the updated subscription information. Note that the decision whether to send first default subscription data and then updated subscription data is done in the UDM. For example, the updated [service] subscription data may be temporarily deactivated, so that the UDM initially sends the default subscription data to the AMF. When the updated subscription data is activated, the processor 605 can then send the updated subscription data. The processor 605 transmits subscription data to the AMF, e.g., to configure the UE and the network (e.g., AMF and RAN) to use the specific service.

In some embodiments, the updated subscription information includes at least one of: a network slice identity, a data network name, information for cell reselection, and an allowed closed-access group list. In some embodiments, the updated subscription information includes a list of UE identities for provisioning with the updated subscription information. In such embodiments, the list of identities may include a list of subscription identities and/or a list of equipment identities.

In some embodiments, the processor 605 sends a request to the AMF for an equipment identity of the UE in response to the list of UE identities including a list of equipment identities. In certain embodiments, determining that the UE requires provisioning includes determining whether a first identity of the UE is found in the list of UE identities and mapping the first identity to a first subscription type, wherein the default subscription type is a subject to an update with the updated subscription information.

In some embodiments, the processor 605 receives a second request to activate or deactivate the updated subscription information, wherein the second request is received from an application function via a NEF (see, e.g., steps 1*c* and 10 of FIGS. 4A-4C). In some embodiments, the processor 605 transmits a container with updated UE parameters to the AMF after successful registration, wherein the AMF forwards the container with updated UE parameters to the UE. In such embodiments, the updated UE parameters may include one or more of: security parameters and (i.e., enhanced) default configured network slice information, wherein the default configured network slice information includes a frequency priority for each of the plurality of network slices.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to registering with a mobile network through another mobile network, for example storing security contexts, IP addresses, UE contexts, and the like. In certain embodiments, the memory 610 also stores program code and related data, such as an operating system ("OS") or other controller algorithms operating on the gateway apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 may communicate with one or more remote units and/or with one or more interworking functions that provide access to one or more PLMNs. The transceiver 625 may also communicate with one or more network functions (e.g., in the mobile core network 130). The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like. In one embodiment, the transceiver 625 implements multiple logical transceivers using different communication protocols or protocol stacks, while using common physical hardware.

FIG. 7 depicts one embodiment of a method 700 for provisioning a UE with information to access a specific service, according to embodiments of the disclosure. In various embodiments, the method 700 is performed by a UE, such as the remote unit 105, the UE 205, and/or the user equipment apparatus 500, described above. In some embodiments, the method 700 is performed by a processor, such as a microcontroller, a microprocessor, a CPU, a GPU, an auxiliary processing unit, a FPGA, or the like.

The method 700 begins and sends 705 a first registration request to register the UE with the mobile communication network, the mobile network supporting a plurality of network slices. The method 700 includes receiving 710 configuration information from the mobile communication network, the configuration information enabling the UE to use at least one network slice from the plurality of network slices. The method 700 includes performing 715 cell reselection using the configuration information which comprises at least a frequency priority for the at least one network slice. The method 700 includes sending 720 a second registration request to the mobile communication network after performing the cell reselection, wherein the second registration requests to register with the at least one network slice. The method 700 ends.

FIG. 8 depicts one embodiment of a method 800 for provisioning a UE with information to access a specific service, according to embodiments of the disclosure. In various embodiments, the method 800 is performed by an AMF, such as the AMF 133, AMF 211 and/or network equipment apparatus 600, described above. In some embodiments, the method 800 is performed by a processor, such as a microcontroller, a microprocessor, a CPU, a GPU, an auxiliary processing unit, a FPGA, or the like.

The method 800 begins and receives 805 a first registration request to register a UE with a mobile communication network. The second method includes receiving 810 subscription information for the UE from the mobile communication network. Here, the subscription information enables the UE to use a specific service. The method 800 includes determining 815 configuration information to be provisioned to the UE. Here, the configuration information includes at least a frequency priority for each of the plurality of network slices. The method 800 includes provisioning 820 the UE with the configuration information. The method 800 includes receiving 825 a second registration request from the UE in response to provisioning the UE. The method 800 ends.

Figure 9:
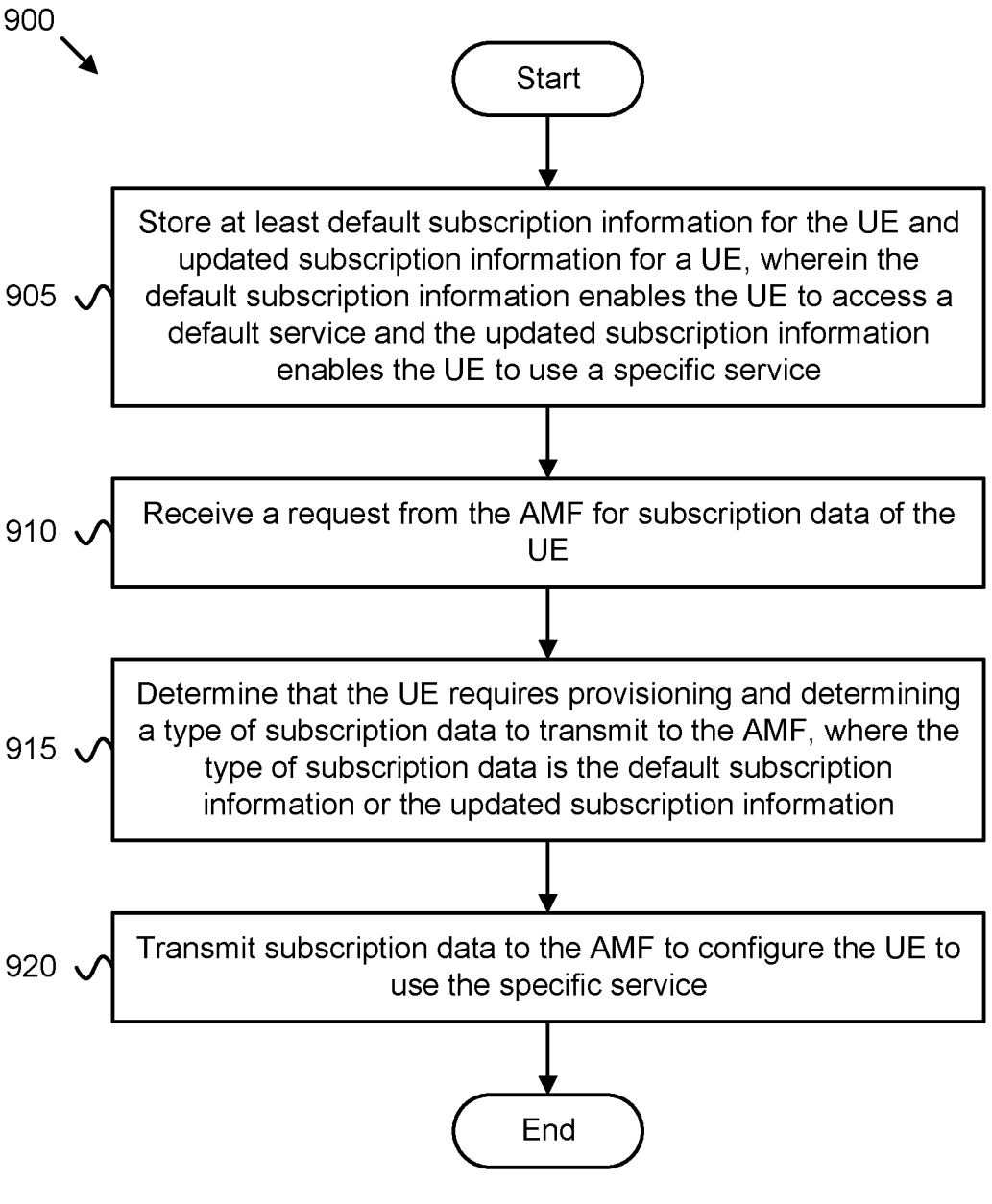
FIG. 9 is a flow chart diagram illustrating one embodiment of a third method for provisioning a UE with information to access a specific service.

FIG. 9 depicts one embodiment of a method 900 for provisioning a UE with information to access a specific service, according to embodiments of the disclosure. In various embodiments, the method 900 is performed by a subscription and user data manager, such as the UDM/UDR 139, the UDM 213, and/or the network equipment apparatus 600, described above. In some embodiments, the method 900 is performed by a processor, such as a microcontroller, a microprocessor, a CPU, a GPU, an auxiliary processing unit, a FPGA, or the like.

The method 900 begins and stores 905 at least default subscription information for the UE and updated subscription information for a UE. Here, the default subscription information enables the UE to access a default service and the updated subscription information enables the UE to use a specific service. The method 900 includes receiving 910 a request from the AMF for subscription data of the UE. The method 900 includes determining 915 that the UE requires provisioning and determining a type of subscription data to transmit to the AMF. Here, the type of subscription data may be the default subscription information or the updated subscription information. The method 900 includes transmitting 920 subscription data to the AMF to configure the UE to use the specific service. The method 900 ends.

Disclosed herein is a first apparatus for provisioning a UE with information to access a specific service, according to embodiments of the disclosure. The first apparatus may be implemented by a UE, such as the remote unit 105, the UE 205 and/or the user equipment apparatus 500. The first apparatus includes a transceiver that communicates with a mobile communication network and a processor that sends a first registration request to the mobile communication network, the mobile network supporting a plurality of network slices. The processor receives configuration information from the mobile communication network, the configuration information enabling the apparatus to use a specific service (e.g., at least one network slice from the plurality of network slices). In one embodiment, the configuration information includes a frequency priority for the at least one network slice. In another embodiment, the configuration information includes a frequency priority for each of the plurality of network slices. The processor performs cell reselection using at least the frequency priority and sends a second registration request to the mobile communication network after performing the cell reselection. In one embodiment, the second registration requests to register with the at least one network slice.

In some embodiments, the configuration information includes network slice configuration data and mobility restrictions configuration data including cell restriction for closed access group. Here, the network slice configuration data includes allowed network slice information and (i.e., enhanced) configured network slice information for the mobile communication network. In such embodiments, receiving the configuration information may include receiving the information from an AMF in the mobile communication network.

In some embodiments, the configuration information includes frequency priorities for (i.e., default) configured network slice information. In some embodiments, the configuration information includes at least one security parameter for secondary authentication, the at least one security parameter including: an identifier, a credential, an association with a service identifier. Here, the service identifier may be a S-NSSAI, a DNN and/or an application.

In certain embodiments, the processor stores the received configuration information in a subscription profile (e.g., in USIM). In other embodiments, the processor stores the received configuration information in a mobile equipment configuration (e.g., at the NAS layer or at an application).

Disclosed herein is a first method for provisioning a UE with information to access a specific service, according to embodiments of the disclosure. The first method may be performed by a UE, such as the remote unit 105, the UE 205 and/or the user equipment apparatus 500. The first method includes sending a first registration request to the mobile communication network, the mobile network supporting a plurality of network slices. The first method includes receiving configuration information from the mobile communication network, the configuration information enabling the UE to use a specific service, wherein the configuration information includes a frequency priority for each of the plurality of network slices. The first method includes performing cell reselection using at least the frequency priority and sending a second registration request to the mobile communication network after performing the cell reselection.

In some embodiments, the configuration information includes network slice configuration data and mobility restrictions configuration data including cell restriction for closed access group. Here, the network slice configuration data includes allowed network slice information and (i.e., enhanced) configured network slice information for the mobile communication network. In such embodiments, receiving the configuration information may include receiving the information from an AMF in the mobile communication network.

In some embodiments, the configuration information includes frequency priorities for (i.e., default) configured network slice information. In some embodiments, the configuration information includes at least one security parameter for secondary authentication, the at least one security parameter including: an identifier, a credential, an association with a service identifier. Here, the service identifier may be a S-NSSAI, a DNN and/or an application.

In certain embodiments, the first method includes storing the received configuration information in a subscription profile of the UE (e.g., in USIM). In other embodiments, the first method includes storing the received configuration information in a mobile equipment configuration of the UE (e.g., at the NAS layer or at an application).

Disclosed herein is a second apparatus for provisioning a UE with information to access a specific service, according to embodiments of the disclosure. The second apparatus may be implemented by an AMF, such as the AMF 133, AMF 211 and/or network equipment apparatus 600. The second apparatus includes a network interface and a processor that receives a first registration request to register a UE with a mobile communication network. The processor receives subscription information for the UE from the mobile communication network, the subscription information enabling the UE to use a specific service. The processor determines configuration information to be provisioned to the UE. Here, the configuration information includes at least a frequency priority for each of the plurality of network slices. The processor provisions the UE with the configuration information and receives a second registration request from the UE in response to provisioning the UE.

In some embodiments, the processor determines whether to provision the UE before a registration result is sent to the UE or to provision the UE together with the registration result. In some embodiments, the processor provisions the UE with the configuration information by performing a UE Configuration Update procedure. In certain embodiments, the processor sends a Registration Reject message to the UE in response to performing the UE Configuration Update procedure, wherein the Registration Reject message triggers cell reselection and re-registration of the UE to the same mobile communication network.

In some embodiments, the processor registers the UE in response to the first registration request. In such embodiments, registering the UE includes receiving default subscription information for the UE, wherein the default subscription information is for a default service (i.e., not including the specific service subscription). In certain embodiments, the default subscription information is updated by the subscription information enabling the UE to use a specific service. In such embodiments, the processor subscribes with the mobile communication network (i.e., UDM) for notifications for the UE subscription and receives the updated subscription information for the UE, wherein the updated subscription information includes the subscription information for the specific service. In some embodiments, the subscription information includes the configuration information with a frequency priority for each of the plurality of network slices.

In some embodiments, the processor provisions the UE with the configuration information by sending a registration accept message. In certain embodiments, the registration accept message includes an empty set of allowed network slices. In certain embodiments, at least one subscribed network slice requires secondary authentication. In such embodiments, the processor skips a secondary authentication procedure (i.e., NSSAA procedure) after sending the registration accept message. In one embodiment, skipping the secondary authentication procedure includes omitting the "Pending NSSAI" parameter in the Registration Accept message.

In some embodiments, the configuration information includes mobility restrictions configuration data including cell restriction for closed access groups and at least one transparent container containing a security parameter for secondary authentication of the UE, the security parameter including at least one of: an identifier, a credential, an association with a service identifier. Here, the service identifier may be a S-NSSAI, a DNN and/or an application. In certain embodiments, the configuration information configures the second apparatus, e.g., by updating the closed access group IDs of allowed NSSAI.

In some embodiments, the processor receives a container with updated UE parameters after successful registration and forwards the container with updated UE parameters to the UE, wherein the updated UE parameters includes at least one of: (i.e., enhanced) default configured network slice information and security parameters, wherein the default configured network slice information includes a frequency priority for each of the plurality of network slices.

In some embodiments, a service subscription of the UE is associated with an equipment identity of the UE, wherein the processor receives a request to provide an additional UE identity and provides the equipment identity of the UE to the network.

Disclosed herein is a second method for provisioning a UE with information to access a specific service, according to embodiments of the disclosure. The second method may be performed by an AMF, such as the AMF 133, AMF 211 and/or network equipment apparatus 600. The second method includes receiving a first registration request to register a UE with a mobile communication network. The second method includes receiving subscription information for the UE from the mobile communication network and determining configuration information to be provisioned to the UE. Here, the subscription information enabling the UE to use a specific service and the configuration information includes at least a frequency priority for each of the plurality of network slices. The second method includes provisioning the UE with the configuration information and receiving a second registration request from the UE in response to provisioning the UE.

In some embodiments, the second method includes determining whether to provision the UE before a registration result is sent to the UE or provision the UE together with the registration result. In some embodiments, the second method includes provisioning the UE with the configuration information by performing a UE Configuration Update procedure. In certain embodiments, the second method includes sending a Registration Reject message to the UE in response to performing the UE Configuration Update procedure, wherein the Registration Reject message triggers cell reselection and re-registration of the UE to the same mobile communication network.

In some embodiments, the second method includes registering the UE in response to the first registration request. In such embodiments, registering the UE includes receiving default subscription information for the UE, wherein the default subscription information is for a default service (i.e., not including the specific service subscription). In certain embodiments, the default subscription information is updated by the subscription information enabling the UE to use a specific service. In such embodiments, the second method includes subscribes with the mobile communication network (i.e., UDM) for notifications for the UE subscription and receives the updated subscription information for the UE, wherein the updated subscription information includes the subscription information for the specific service. In some embodiments, the subscription information includes the configuration information with a frequency priority for each of the plurality of network slices.

In some embodiments, the second method includes provisioning the UE with the configuration information by sending a registration accept message. In certain embodiments, the registration accept message includes an empty set of allowed network slices. In certain embodiments, at least one subscribed network slice requires secondary authentication. In such embodiments, the second method includes skipping a secondary authentication procedure (i.e., NSSAA procedure) after sending the registration accept message. In one embodiment, skipping the secondary authentication procedure includes omitting the "Pending NSSAI" parameter in the Registration Accept message.

In some embodiments, the configuration information includes mobility restrictions configuration data including cell restriction for closed access groups and at least one transparent container containing a security parameter for secondary authentication of the UE, the security parameter including at least one of: an identifier, a credential, an association with a service identifier. Here, the service identifier may be a S-NSSAI, a DNN and/or an application identifier. In certain embodiments, the configuration information configures the second apparatus, e.g., by updating the closed access group IDs of allowed NSSAI.

In some embodiments, the second method includes receiving a container with updated UE parameters after successful registration and forwards the container with updated UE parameters to the UE. Here, the updated UE parameters may include default configured network slice information and/or security parameters, wherein the default configured network slice information includes a frequency priority for each of the plurality of network slices.

In some embodiments, a service subscription of the UE is associated with an equipment identity of the UE, wherein the second method includes receives a request to provide an additional UE identity and provides the equipment identity of the UE to the network.

Disclosed herein is a third apparatus for provisioning a UE with information to access a specific service, according to embodiments of the disclosure. The third apparatus may be implemented by a subscription and user data manager, such as the UDM/UDR 139, the UDM 213, and/or the network equipment apparatus 600. The third apparatus includes a network interface for communicating with at least an AMF in a mobile communication network and a processor that stores subscription information for a UE. The processor stores at least default subscription information for the UE and updated subscription information for a UE. Here, the default subscription information enables the UE to access a default service and the updated subscription information enables the UE to use a specific service. The processor receives a request from the AMF for subscription data of the UE and determines that the UE requires provisioning and determining a type of subscription data to transmit to the AMF. Here, the type of subscription data may be the default subscription information or the updated subscription information. The processor transmits subscription data to the AMF to configure the UE to use the specific service.

In various embodiments, the subscription data also configures the mobile communication network (e.g., AMF and/or RAN) to use the specific service. For example, the updated subscription information may be used by the network to update the list of allowed Closed Access Group IDs or the allowed NSSAI stored in the AMF and sent to the access network. In some embodiments, the updated subscription information includes at least one of: a network slice identity, a data network name, information for cell reselection, and an allowed closed-access group list. In some embodiments, the updated subscription information includes a list of UE identities for provisioning with the updated subscription information. In such embodiments, the list of identities may include a list of subscription identities and/or a list of equipment identities.

In some embodiments, the processor sends a request to the AMF for an equipment identity of the UE in response to the list of UE identities including a list of equipment identities. In certain embodiments, determining that the UE requires provisioning includes determining whether a first identity of the UE is found in the list of UE identities and mapping the first identity to a first subscription type, wherein the default subscription type is a subject to an update with the updated subscription information.

In some embodiments, the processor receives a second request to activate or deactivate the updated subscription information, wherein the second request is received from an application function via a NEF. In some embodiments, the processor transmits a container with updated UE parameters to the AMF after successful registration, wherein the AMF forwards the container with updated UE parameters to the UE. In such embodiments, the updated UE parameters may include one or more of: security parameters and (i.e., enhanced) default configured network slice information, wherein the default configured network slice information includes a frequency priority for each of the plurality of network slices.

Disclosed herein is a third method for provisioning a UE with information to access a specific service, according to embodiments of the disclosure. The third method may be performed by a subscription and user data manager, such as UDM/UDR 139, the UDM 213, and/or the network equipment apparatus 600. The third method includes storing at least default subscription information for the UE and updated subscription information for a UE. Here, the default subscription information enables the UE to access a default service and the updated subscription information enable the UE to use a specific service. The third method includes receiving a request from the AMF for subscription data of the UE and determining that the UE requires provisioning and determining a type of subscription data to transmit to the AMF. Here, the type of subscription data may be the default subscription information or the updated subscription information. The third method includes transmitting subscription data to the AMF to configure the UE to use the specific service.

In some embodiments, the updated subscription information includes at least one of: a network slice identity, a data network name, information for cell reselection, and an allowed closed-access group list. In some embodiments, the updated subscription information includes a list of UE identities for provisioning with the updated subscription information. In such embodiments, the list of identities may include a list of subscription identities and/or a list of equipment identities.

In some embodiments, the third method includes sending a request to the AMF for an equipment identity of the UE in response to the list of UE identities including a list of equipment identities. In certain embodiments, determining that the UE requires provisioning includes determining whether a first identity of the UE is found in the list of UE identities and mapping the first identity to a first subscription type, wherein the default subscription type is a subject to an update with the updated subscription information.

In some embodiments, the third method includes receiving a second request to activate or deactivate the updated subscription information, wherein the second request is received from an application function via a NEF. In some embodiments, the third method includes transmitting a container with updated UE parameters to the AMF after successful registration, wherein the AMF forwards the container with updated UE parameters to the UE. In such embodiments, the updated UE parameters may include one or more of: security parameters and (i.e., enhanced) default configured network slice information, wherein the default configured network slice information includes a frequency priority for each of the plurality of network slices.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for wireless communication comprising a network function, the apparatus further comprising:
   at least one memory; and
   at least one processor coupled with the at least one memory and configured to cause the network function to:
   receive, from a provisioning server, a message to subscribe for a user equipment (UE) reachability status associated with a remote provisioning for a set of credentials;
   determine whether the UE is reachable for the remote provisioning based at least in part on the message and the UE being able to establish a user plane connection to the provisioning server; and
   transmit a notification that the UE is reachable based at least in part on the determination.

2. The apparatus of claim 1, wherein the network function comprises a unified data management (UDM).

3. The apparatus of claim 1, wherein the set of credentials is associated with one or more of network slice-specific authentication and authorization (NSSAA) or secondary authentication and authorization (SAA).

4. The apparatus of claim 1, wherein, to transmit the notification that the UE is reachable, the at least one processor is configured to cause the apparatus to transmit the notification to the provisioning server.

5. The apparatus of claim 1, wherein the user plane connection comprises a protocol data unit (PDU) session.

6. The apparatus of claim 1, wherein the at least one processor is further configured to cause the apparatus to:
   receive a second message that indicates the UE is registered to a subscribed network associated with the network function;
   determine whether to provision the set of credentials to the UE based at least in part on the received second message; and
   provision the set of credentials to the UE based at least in part on the determination.

7. The apparatus of claim 1, wherein the at least one processor is further configured to cause the apparatus to store the provisioning server's subscription to the UE reachability status.

8. The apparatus of claim 1, wherein the provisioning server comprises an external provisioning server.

9. A processor for wireless communication at a network function, comprising:
   at least one memory configured to cause the processor to:
   receive, from a provisioning server, a message to subscribe for a user equipment (UE) reachability status associated with a remote provisioning for a set of credentials;
   determine whether the UE is reachable for the remote provisioning based at least in part on the message and the UE being able to establish a user plane connection to the provisioning server; and
   transmit a notification that the UE is reachable based at least in part on the determination.

10. The processor of claim 9, wherein the network function comprises a unified data management (UDM).

11. The processor of claim 9, wherein the set of credentials is associated with one or more of network slice-specific authentication and authorization (NSSAA) or secondary authentication and authorization (SAA).

12. The processor of claim 9, wherein to transmit the notification that the UE is reachable, the at least one memory is configured to cause the processor to transmit the notification to the provisioning server.

13. The processor of claim 9, wherein the user plane connection comprises a protocol data unit (PDU) session.

14. The processor of claim 9, wherein the at least one memory is configured to cause the processor to:
   receive a message that indicates the UE is registered to a subscribed network associated with the network function;
   determine whether to provision a set of credentials to the UE based at least in part on the received message, wherein the set of credentials is for network slice-specific authentication and authorization (NSSAA) or secondary authentication and authorization (SAA), or a combination thereof; and
   provision the set of credentials to the UE based at least in part on the determination.

15. The processor of claim 9, wherein the at least one memory is further configured to cause the processor to store the provisioning server's subscription to the UE reachability status.

16. The processor of claim 9, wherein the provisioning server comprises an external provisioning server.

17. A method performed at a network function, the method comprising:
   receiving, from a provisioning server, a message to subscribe for a user equipment (UE) reachability status associated with a remote provisioning for a set of credentials;
   determining whether the UE is reachable for the remote provisioning based at least in part on the message and the UE being able to establish a user plane connection to the provisioning server; and
   transmitting a notification that the UE is reachable based at least in part on the determination.

18. The method of claim 17, wherein the network function comprises a unified data management (UDM), and wherein the set of credentials is associated with one or more of network slice-specific authentication and authorization (NSSAA) or secondary authentication and authorization (SAA).

19. The method of claim 17, wherein transmitting the notification that the UE is reachable comprises transmitting the notification to the provisioning server.

20. The method of claim 17, further comprising storing the provisioning server's subscription to the UE reachability status.

* * * * *